US012659538B2

(12) United States Patent
Matsubara et al.

(10) Patent No.: US 12,659,538 B2
(45) Date of Patent: *Jun. 16, 2026

(54) PORTABLE TERMINAL, INFORMATION PROCESSING APPARATUS, CONTENT DISPLAY SYSTEM AND CONTENT DISPLAY METHOD

(71) Applicant: MAXELL, LTD., Kyoto (JP)

(72) Inventors: Takashi Matsubara, Yokohama (JP);
Mayumi Nakade, Yokohama (JP);
Masahiro Yamazaki, Yokohama (JP);
Hiroyuki Higaki, Yokohama (JP)

(73) Assignee: Maxell, Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/316,808

(22) Filed: Sep. 2, 2025

(65) Prior Publication Data

US 2025/0386070 A1 Dec. 18, 2025

Related U.S. Application Data

(63) Continuation of application No. 17/847,798, filed on Jun. 23, 2022, now Pat. No. 12,526,465, which is a
(Continued)

(30) Foreign Application Priority Data

Sep. 26, 2007 (JP) ................................. 2007-248353

(51) Int. Cl.
*H04N 21/414* (2011.01)
*G06F 3/04842* (2022.01)
(Continued)

(52) U.S. Cl.
CPC ... *H04N 21/41407* (2013.01); *G06F 3/04842* (2013.01); *H04H 60/80* (2013.01);
(Continued)

(58) Field of Classification Search
CPC .... H04N 21/41407; H04N 5/44; H04N 5/445; H04N 21/25866; H04N 21/41265;
(Continued)

(56) References Cited

U.S. PATENT DOCUMENTS 5,412,404 A 5/1995 Candy
5,778,187 A 7/1998 Monteiro et al.
(Continued)

FOREIGN PATENT DOCUMENTS

CN 1353540 A 6/2002
EP 1667411 A1 6/2006
(Continued)

OTHER PUBLICATIONS

Vilovic I., et al, "Performance of the Bluetooth-based WPAN for Multimedia Communication", The Polytechnic of Dubrovnik, Faculty of Electrical Engineering and Computing, EC-VIP-MC 2003, 4th EURASIP Conference on Video/Image Processing and Multimedia Communications, Jul. 2-5, 2003, pp. 783-788.
(Continued)

*Primary Examiner* — Oschta I Montoya
(74) *Attorney, Agent, or Firm* — Rimon P.C.

(57) ABSTRACT

A portable terminal includes a receiving unit which receives content information, an external device communication unit which conducts communication with an external information device, a display unit which displays the content information received by the receiving unit, an acquiring unit which acquires identification information identifying the content information displayed by the display unit, an operation unit which receives an operation indication from a user, and a control unit which conducts control such that if a transmission indication of the identification information is received by the operation unit while the content information is being displayed, the identification information acquired
(Continued)

by the acquiring unit is transmitted to the external information device and the display of the content information by the display unit is terminated.

19 Claims, 10 Drawing Sheets

Related U.S. Application Data continuation of application No. 17/386,496, filed on Jul. 27, 2021, now Pat. No. 12,108,103, which is a continuation of application No. 17/031,574, filed on Sep. 24, 2020, now Pat. No. 11,477,508, which is a continuation of application No. 16/595,057, filed on Oct. 7, 2019, now Pat. No. 10,951,940, which is a continuation of application No. 16/299,732, filed on Mar. 12, 2019, now Pat. No. 10,484,733, which is a continuation of application No. 16/143,237, filed on Sep. 26, 2018, now Pat. No. 10,271,086, which is a continuation of application No. 15/845,680, filed on Dec. 18, 2017, now Pat. No. 10,116,984, which is a continuation of application No. 15/402,433, filed on Jan. 10, 2017, now Pat. No. 9,883,225, which is a continuation of application No. 14/919,367, filed on Oct. 21, 2015, now Pat. No. 9,578,369, which is a continuation of application No. 14/501,621, filed on Sep. 30, 2014, now Pat. No. 9,197,917, which is a continuation of application No. 14/029,548, filed on Sep. 17, 2013, now Pat. No. 8,892,688, which is a continuation of application No. 13/489,877, filed on Jun. 6, 2012, now Pat. No. 8,549,109, which is a continuation of application No. 12/170,938, filed on Jul. 10, 2008, now Pat. No. 8,214,459.

(51) Int. Cl.

| | |
|---|---|
| *H04H 60/80* | (2008.01) |
| *H04M 1/72415* | (2021.01) |
| *H04N 5/44* | (2011.01) |
| *H04N 5/445* | (2011.01) |
| *H04N 21/258* | (2011.01) |
| *H04N 21/41* | (2011.01) |
| *H04N 21/422* | (2011.01) |
| *H04N 21/43* | (2011.01) |
| *H04N 21/4363* | (2011.01) |
| *H04N 21/462* | (2011.01) |
| *H04N 21/4782* | (2011.01) |
| *H04N 21/858* | (2011.01) |
| *H04W 8/18* | (2009.01) |
| *H04M 1/72412* | (2021.01) |
| *H04M 1/72445* | (2021.01) |
| *H04N 21/478* | (2011.01) |

(52) U.S. Cl.
CPC .......... *H04M 1/72415* (2021.01); *H04N 5/44* (2013.01); *H04N 5/445* (2013.01); *H04N 21/25866* (2013.01); *H04N 21/41265* (2020.08); *H04N 21/42204* (2013.01); *H04N 21/4302* (2013.01); *H04N 21/43637* (2013.01); *H04N 21/4622* (2013.01); *H04N 21/4782* (2013.01); *H04N 21/8586* (2013.01); *H04W 8/18* (2013.01); *H04M 1/72412* (2021.01); *H04M 1/72445* (2021.01); *H04N 21/4222* (2013.01); *H04N 21/478* (2013.01)

(58) Field of Classification Search
CPC ......... H04N 21/42204; H04N 21/4302; H04N 21/43637; H04N 21/4622; H04N 21/4782; H04N 21/8586; H04N 21/4222; H04N 21/478; G06F 3/04842; H04H 60/80; H04M 1/72415; H04M 1/72412; H04M 1/72445; H04W 8/18
See application file for complete search history.

(56) References Cited

U.S. PATENT DOCUMENTS

| | | | |
|---|---|---|---|
| 5,831,664 | A | 11/1998 | Wharton et al. |
| 6,097,441 | A | 8/2000 | Allport |
| 6,240,555 | B1 | 5/2001 | Shoff et al. |
| 6,349,410 | B1 | 2/2002 | Lortz |
| 6,476,825 | B1 | 11/2002 | Croy et al. |
| 6,637,028 | B1 | 10/2003 | Voyticky et al. |
| 6,889,385 | B1 | 5/2005 | Rakib et al. |
| 7,032,172 | B1 | 4/2006 | Lee et al. |
| 7,136,709 | B2 | 11/2006 | Arling et al. |
| 7,190,977 | B2 | 3/2007 | Hikishima |
| 7,251,478 | B2 | 7/2007 | Cortegiano |
| 7,477,321 | B2 | 1/2009 | Yokoyama et al. |
| 7,594,109 | B2 | 9/2009 | Minne |
| 7,650,621 | B2 | 1/2010 | Thomas et al. |
| 7,699,229 | B2 | 4/2010 | Bennett et al. |
| 7,796,512 | B2 | 9/2010 | Komiya et al. |
| 7,852,416 | B2 | 12/2010 | Bennett et al. |
| 7,907,214 | B2 | 3/2011 | Kim |
| 7,924,168 | B2 | 4/2011 | Otsu et al. |
| 7,932,959 | B2 | 4/2011 | Bennett et al. |
| 7,933,955 | B2 | 4/2011 | Khalatian |
| 7,987,491 | B2 | 7/2011 | Reisman |
| 8,054,294 | B2 | 11/2011 | Sakai et al. |
| 8,063,989 | B2 | 11/2011 | Furutani |
| 8,145,040 | B2 | 3/2012 | Toyoshima |
| 8,321,898 | B2 | 11/2012 | Yuasa et al. |
| 8,402,505 | B2 | 3/2013 | Alten |
| 8,578,429 | B2 | 11/2013 | Lim et al. |
| 8,644,883 | B2 | 2/2014 | Jin et al. |
| 8,863,187 | B2 | 10/2014 | Ho et al. |
| 8,973,064 | B2 | 3/2015 | Bennett et al. |
| 9,015,329 | B2 | 4/2015 | Chang et al. |
| 9,055,194 | B2 | 6/2015 | Cho et al. |
| 9,225,925 | B2 | 12/2015 | Bennett et al. |
| 9,247,175 | B2 | 1/2016 | Bennett et al. |
| 9,277,156 | B2 | 3/2016 | Bennett et al. |
| 9,401,080 | B2 | 7/2016 | Rachamadugu |
| 9,836,257 | B2 | 12/2017 | Chang et al. |
| 10,165,320 | B2 | 12/2018 | Sato et al. |
| 2001/0055951 | A1 | 12/2001 | Slotznick |
| 2002/0002707 | A1 | 1/2002 | Ekel et al. |
| 2002/0004404 | A1 | 1/2002 | Squibbs |
| 2002/0091834 | A1 | 7/2002 | Isozu et al. |
| 2002/0186676 | A1 | 12/2002 | Milley et al. |
| 2003/0020693 | A1 | 1/2003 | Nashida |
| 2003/0040334 | A1 | 2/2003 | Lee |
| 2003/0078038 | A1 | 4/2003 | Kurosawa et al. |
| 2003/0097659 | A1 | 5/2003 | Goldman |
| 2003/0103088 | A1 | 6/2003 | Dresti et al. |
| 2003/0131353 | A1 | 7/2003 | Blom et al. |
| 2003/0188322 | A1 | 10/2003 | Bontempi |
| 2004/0003051 | A1 | 1/2004 | Krzyzanowski et al. |
| 2004/0031058 | A1 | 2/2004 | Reisman |
| 2004/0046783 | A1 | 3/2004 | Montebovi |
| 2004/0107447 | A1 | 6/2004 | Katagishi |
| 2004/0107449 | A1 | 6/2004 | Fukuda et al. |
| 2004/0152414 | A1 | 8/2004 | Wang |
| 2004/0158854 | A1 | 8/2004 | Nagasawa et al. |
| 2004/0210657 | A1 | 10/2004 | Narayanan et al. |
| 2004/0215611 | A1 | 10/2004 | Jawa |
| 2004/0242304 | A1 | 12/2004 | Walker et al. |
| 2004/0243694 | A1 | 12/2004 | Weast |
| 2005/0091572 | A1 | 4/2005 | Gavrilescu et al. |
| 2005/0096753 | A1 | 5/2005 | Arling et al. |
| 2005/0110909 | A1 | 5/2005 | Staunton et al. |
| 2005/0125819 | A1 | 6/2005 | Ono et al. |
| 2005/0132264 | A1 | 6/2005 | Joshi |
| 2005/0138654 | A1 | 6/2005 | Minne |

(56) References Cited

U.S. PATENT DOCUMENTS

| | | |
|---|---|---|
| 2005/0144321 A1 | 6/2005 | Forsberg |
| 2005/0174488 A1 | 8/2005 | Chennakeshu |
| 2005/0174489 A1 | 8/2005 | Yokoyama et al. |
| 2005/0229226 A1 | 10/2005 | Relan et al. |
| 2005/0262254 A1 | 11/2005 | Sherwani |
| 2005/0262535 A1 | 11/2005 | Uchida et al. |
| 2005/0282582 A1 | 12/2005 | Slotznick |
| 2006/0002315 A1 | 1/2006 | Theurer et al. |
| 2006/0015649 A1 | 1/2006 | Zutaut et al. |
| 2006/0031549 A1 | 2/2006 | Janik et al. |
| 2006/0053472 A1 | 3/2006 | Goto et al. |
| 2006/0058013 A1 | 3/2006 | Bocking et al. |
| 2006/0064720 A1 | 3/2006 | Istvan et al. |
| 2006/0117371 A1 | 6/2006 | Margulis |
| 2006/0149811 A1 | 7/2006 | Bennett et al. |
| 2006/0172700 A1 | 8/2006 | Wu |
| 2006/0212902 A1 | 9/2006 | Seo |
| 2006/0253874 A1 | 11/2006 | Stark et al. |
| 2006/0256751 A1 | 11/2006 | Jagadeesan et al. |
| 2006/0259942 A1 | 11/2006 | Toyama et al. |
| 2006/0262220 A1 | 11/2006 | Nakamura et al. |
| 2006/0262221 A1 | 11/2006 | Yuasa et al. |
| 2006/0263048 A1 | 11/2006 | Sato et al. |
| 2006/0290823 A1 | 12/2006 | Kondo |
| 2007/0053514 A1 | 3/2007 | Imai et al. |
| 2007/0094691 A1 | 4/2007 | Gazdzinski |
| 2007/0099560 A1 | 5/2007 | Bowen et al. |
| 2007/0106748 A1* | 5/2007 | Jakobsson ............... H04L 67/02 |
| | | 709/217 |
| 2007/0124765 A1 | 5/2007 | Bennett et al. |
| 2007/0124772 A1 | 5/2007 | Bennett et al. |
| 2007/0124775 A1 | 5/2007 | DaCosta |
| 2007/0124777 A1 | 5/2007 | Bennett et al. |
| 2007/0124778 A1 | 5/2007 | Bennett et al. |
| 2007/0124792 A1 | 5/2007 | Bennett et al. |
| 2007/0136488 A1 | 6/2007 | Cho et al. |
| 2007/0136778 A1 | 6/2007 | Birger |
| 2007/0146542 A1 | 6/2007 | Strasser |
| 2007/0150817 A1 | 6/2007 | Ducheneaut et al. |
| 2007/0152975 A1 | 7/2007 | Ogihara et al. |
| 2007/0155307 A1 | 7/2007 | Ng et al. |
| 2007/0162938 A1 | 7/2007 | Bennett et al. |
| 2007/0162939 A1 | 7/2007 | Bennett et al. |
| 2007/0162941 A1 | 7/2007 | Bennett et al. |
| 2007/0165144 A1 | 7/2007 | Bennett et al. |
| 2007/0191070 A1 | 8/2007 | Rao |
| 2007/0195756 A1 | 8/2007 | Komiya et al. |
| 2007/0198656 A1 | 8/2007 | Mazzaferri et al. |
| 2007/0216666 A1 | 9/2007 | Anis |
| 2007/0216760 A1 | 9/2007 | Kondo et al. |
| 2007/0234048 A1 | 10/2007 | Ziv |
| 2007/0269037 A1 | 11/2007 | Gardiner et al. |
| 2007/0290876 A1 | 12/2007 | Sato et al. |
| 2008/0010501 A1 | 1/2008 | Bucher et al. |
| 2008/0076470 A1 | 3/2008 | Ueda et al. |
| 2008/0086550 A1 | 4/2008 | Evora et al. |
| 2008/0133715 A1 | 6/2008 | Yoneda et al. |
| 2008/0155159 A1 | 6/2008 | Rivas |
| 2008/0196072 A1 | 8/2008 | Chun |
| 2008/0229207 A1 | 9/2008 | Kataoka |
| 2008/0246736 A1 | 10/2008 | Han |
| 2008/0311952 A1 | 12/2008 | Sugiyama |
| 2008/0320542 A1 | 12/2008 | Guzman et al. |
| 2009/0019492 A1 | 1/2009 | Grasset |
| 2009/0030914 A1 | 1/2009 | Goto |
| 2009/0061841 A1 | 3/2009 | Chaudhri et al. |
| 2009/0063690 A1 | 3/2009 | Verthein et al. |
| 2009/0067425 A1 | 3/2009 | Komiya et al. |
| 2009/0148129 A1 | 6/2009 | Hayashi |
| 2009/0149125 A1 | 6/2009 | Slotznick |
| 2009/0254778 A1 | 10/2009 | Huang et al. |
| 2009/0288132 A1 | 11/2009 | Hegde |
| 2010/0023599 A1* | 1/2010 | Azuma ............ H04N 21/42204 |
| | | 709/217 |
| 2010/0173677 A1 | 7/2010 | Fu |

FOREIGN PATENT DOCUMENTS

| | | | |
|---|---|---|---|
| EP | 1760584 | A1 | 3/2007 |
| EP | 1830558 | A1 | 9/2007 |
| EP | 1845684 | A1 | 10/2007 |
| EP | 2071828 | A1 | 6/2009 |
| EP | 1791327 | B1 | 7/2014 |
| JP | H06-303452 | A | 10/1994 |
| JP | 2003-018576 | A | 1/2003 |
| JP | 2003-179773 | A | 6/2003 |
| JP | 2003-244289 | A | 8/2003 |
| JP | 2003-333359 | A | 11/2003 |
| JP | 2004-048132 | A | 2/2004 |
| JP | 2004-048521 | A | 2/2004 |
| JP | 2004-078352 | A | 3/2004 |
| JP | 2004-159099 | A | 6/2004 |
| JP | 2004-166256 | A | 6/2004 |
| JP | 2004-228639 | A | 8/2004 |
| JP | 2005-100200 | A | 4/2005 |
| JP | 2005-135346 | A | 5/2005 |
| JP | 2005-175862 | A | 6/2005 |
| JP | 2005-176218 | A | 6/2005 |
| JP | 2005-203893 | A | 7/2005 |
| JP | 2005-210260 | A | 8/2005 |
| JP | 2005-223628 | A | 8/2005 |
| JP | 2006-013847 | A | 1/2006 |
| JP | 2006-014122 | A | 1/2006 |
| JP | 2006-041821 | A | 2/2006 |
| JP | 2006-041950 | A | 2/2006 |
| JP | 2006-067198 | A | 3/2006 |
| JP | 2006-108902 | A | 4/2006 |
| JP | 2006-135846 | A | 5/2006 |
| JP | 2006-286855 | A | 10/2006 |
| JP | 2006-319680 | A | 11/2006 |
| JP | 2006-338406 | A | 12/2006 |
| JP | 2007-028079 | | 2/2007 |
| JP | 2007-074056 | A | 3/2007 |
| JP | 2007-074265 | A | 3/2007 |
| JP | 2007-074529 | A | 3/2007 |
| JP | 2007-189576 | A | 7/2007 |
| JP | 2007-195121 | A | 8/2007 |
| JP | 3953497 | B2 | 8/2007 |
| JP | 2008-160301 | A | 7/2008 |
| JP | 2009-080593 | A | 4/2009 |
| JP | 4916232 | B2 | 4/2012 |
| KR | 10-2007-0061620 | | 6/2007 |
| KR | 10-0756555 | B1 | 9/2007 |
| WO | 2005/071530 | A1 | 8/2005 |
| WO | 2005/071936 | A2 | 8/2005 |
| WO | 2006/028203 | A1 | 3/2006 |
| WO | 2006067954 | A1 | 6/2006 |
| WO | 2006098263 | A1 | 9/2006 |
| WO | 2007/043427 | A1 | 4/2007 |
| WO | 2007/107982 | A1 | 9/2007 |
| WO | 2007144682 | A1 | 12/2007 |
| WO | 2008042458 | A2 | 10/2008 |

OTHER PUBLICATIONS

Ahmad, M.R et al., "Multimedia Transmission over Interworking of Bluetooth WPAN and IEEE 802.11g WLAN Networks", wireless Communication Centre (WCC), Faculty of Electrical Engineering, University of Technology Malaysia, 2005, pp. 380-383.

J.Y. Khan et al. "Bluetooth-Based Wireless Personal Area Network for Multimedia Communication" Proceedings of the First IEEE International Workshop on Electronic Design, Test and Application, 2002 (5 pages).

"Wireless A/G USB Network Adapter, User Guide" Linksys, Cisco Systems, Model No. WUSB54AG, 2004 (51 pages).

"Wireless-G USB Network Adapter User Guide" Linksys by Cisco, Model: WUSB54G, 2008 (40 pages).

"Quick Installation Guide—Wireless-G, USB Network Adapter, Model No. WUSB54G," 2004 (2 pages).

Information Technology—Telecommunications and Information exchange between systems—Local and metropolitan are networks—Specific requirements; Part 11: Wireless LAN Medium Access

(56) References Cited

OTHER PUBLICATIONS

Control (MAC) and Physical Layer Specifications, ANSI/IEEE Std 802.11, 1999 Edition (528 pages).
Supplement to IEEE Standard for Information Technology—Telecommunications and Information exchange between systems—Local and metropolitan are networks—Specific requirements; Part 11: Wireless LAN Medium Access Control (MAC) and Physical Layer Specifications, High-speed Physical Layer in the 5 GHZ Band, ANSI/IEEE Std 802.11, 1999 Edition (90 pages).
"Nokia E90 Communicator User Guide" Nokia Eseries, 9251240, Issue 2, 2007 (93 pages).
"Realplayer 8 Plus User Manual" Realplayer Plus, 2000 (112 pages).
"Tivo User Guide" Humax Easy Digital, Series 2, TiVo DVR User's Guide, 2004 (191 Pages).
"HP MediaSmart HDTV User's Guide", HP Invent, 2006 (310 pages).
"Transmission of Non-Telephone Signals—Generic Coding of Moving Pictures and Associated Audio Information: Systems" International Telecommunication Union, H.222.0, 1995 (135 pages).
"ViewStation Applications: Implications for Network Traffic" C.J. Lindblad et al., IEEE Journal on Selected Areas in Communications, vol. 13, No. 5, Jun. 1995 (11 pages).
"The VuSystem: A Programming System for Compute-Intensive Multimedia" C.J. Lindblad et al., Telemedia Networks and Systems Group, Laboratory for Computer Science, Massachusetts Institute of Technology, 1996 (19 pages).
"ViewStation Applications: Intelligent Video Processing Over a Broadband Local Area Network" C.J. Lindblad et al., Telemedia Networks and Systems Group, Laboratory for Computer Science, Massachusetts Institute of Technology, 1994 (15 pages).
"Soft Handoffs in CDMA Mobile Systems", Daniel Wong and Teng Joon Lim, Stanford University/National University of Singapore, IEEE Personal Communications, Dec. 1997 (17 pages).
"Dynamic Resource Allocation with a Soft Handover Procedure for Application in a Broadband Systems" G. Lupo et al., Universita degli Studi di Roma, La Sapienza—Dipartamento Infocom, IEEE, 1999 (5 pages).
"Increasing communication availability with signal-based mobile controlled handoffs" D. Fosberg et al., TSE-Institute, Institute, Telecommunications and Software Engineering, Laboratory of Information Processing Science, 2000 (14 pages).
Kim, S.H., Jang, Y.M. (2003). Soft QoS-Based Vertical Handover Scheme for WLAN and WCDMA Networks Using Dynamic Programming Approach. In: Lee, J., Kang, CH. (eds) Mobile Communications. CIC 2002. Lecture Notes in Computer Science, vol. 2524. Springer, Berlin, Heidelberg. https://doi.org/10.1007/3-540-36555-9_15 (6 pages).
R. A. Beyah, C. S. Turner, C. L. Corbett and J. A. Copeland, "A mobility enhancement for switched wireless Ethernet with soft handoff," The 2002 45th Midwest Symposium on Circuits and Systems, 2002. MWSCAS-2002., Tulsa, OK, USA, 2002, pp. I-400, doi: 10.1109/MWSCAS.2002.1187241.(4 pages).
"Smart in Technology" Fujitsu F906i comes with AuthenTec/TrueNav: Iphone Competitor, Aug. 3, 2008 (3 pages).
P. Johansson, M. Kazantzidis, R. Kapoor and M. Gerla, "Bluetooth: an enabler for personal area networking," in IEEE Network, vol. 15, No. 5, pp. 28-37, Sep.-Oct. 2001, doi: 10.1109/65.953231 (17 pages).
"Mobile and Wireless Designs Essentials" M. Mallick, ISBN: 0471214191, 2003 (352 pages).
"TCP Keepalive HOWTO" F. Busatto, May 4, 2007, retrieved on Jan. 17, 2023 (11 pages).
"Transmission Control Protocol—DARPA Internet Program—Protocol Specification" Sep. 1981 prepared for Defense Advanced Research Projects Agency by Information Sciences Institute, University of Southern California (91 pages).
"A Taxonomy for Widow Manager User Interfaces" B. A. Myers, Carnegie Mellon University, Windows Interfaces, Sep. 1988 (20 pages).

"Compuvision or Teleputer?" L. Press, Personal Computing, Communications of the ACM, Sep. 1990/vol. 33, No. 9 (8 pages).
"Operational Guidelines for Digital Terrestrial Television Broadcasting" ARIB Technical Report, B14, version 2.8-E2, May 29, 2006 (589 pages).
"Defining and Designing the Digital Future" Paul Kunkel, Digital Dreams: the work of the Sony Design Center, 1999 (21 pages).
"Macintosh Human Interface Guidelines" by Apple computer, Inc. ISBN 0-201-62216-5, 1992 (39 pages).
"Newton's Telecom Dictionary" by Harry Newton, CMP Books 20th Edition, Mar. 2004 (8 pages).
"Computer Dictionary" Microsoft Press, Third Edition, ISBN 1-57231-743-4, 1997 (11 pages).
Apostolopoulos, John & Tan, Wai-Tian & Wee, Susie. (2002). Video streaming: Concepts, algorithms, and systems. (35 pages).
J. Ribas-Corbera, P. A. Chou and S. Regunathan, "A flexible decoder buffer model for JVT video coding," Proceedings. International Conference on Image Processing, Rochester, NY, USA, 2002, pp. II-II, doi: 10.1109/ICIP.2002.1039995. (4 pages).
Tsang-Ling Sheu and Jiin-Tarng Fang, "A buffer allocation mechanism for VBR video playback," WCC 2000—ICCT 2000. 2000 International Conference on Communication Technology Proceedings (Cat. No. 00EX420), Beijing, China, 2000, pp. 1641-1644 vol. 2, doi: 10.1109/ICCT.2000.890974. (4 pages).
Rong, L., Burnett, I. (2004). Application level session hand-off management in a ubiquitous multimedia environment. In Proceedings of the First International Conference on E-Business and Telecommunication Networks, pp. 223-229 (7 pages).
D. Komiya et al., "Use Cases for Session Mobility in Multimedia Application" Matsuhshita Electric(Panasonic), 2006 (7 pages).
D. Komiya et al., "Use Cases for Session Mobility in Multimedia Application", MMusic Working Group, Internet Draft, Feb. 27, 2006, Panasonic, pp. 1-11 (11 pages).
S. Mate et al. "Movable-multimedia: session mobility in ubiquitous computing ecosystem", RightsLink, Dec. 4, 2006 (5 pages).
Cui, Y., Nahrstedt, K. & Xu, D. Seamless User-Level Handoff in Ubiquitous Multimedia Service Delivery. Multimedia Tools and Applications 22, 137-170 (2004). https://doi.org/10.1023/B:MTAP.0000011932.28891.a0 (35 pages).
"Handbook of Image & Video Processing" 2nd Edition, Department of Electrical and Computer Engineering, The University of Texas at Austin, 2005 (1430 pages).
"Handbook of Image & Video Processing" Department of Electrical and Computer Engineering, The University of Texas at Austin, 2000 (974 pages).
Bederson, Ben. (2001). PhotoMesa: A zoomable image browser using quantum treemaps and bubblemaps. UIST (User Interface Software and Technology): Proceedings of the ACM Symposium. 71-80. 10.1145/502348.502359. (10 pages).
"Introducing Microsoft Windows 95" Brent Ethington, Published by Microsoft Press, pp. 1-28, 1995 (28 pages).
"Introducing Microsoft Windows 95" Brent Ethington, Published by Microsoft Press, pp. 29-56, 1995 (28 pages).
Furnas, G. W., & Zacks, J. (1994). Multitrees: enriching and reusing hierarchical structure. In B. Adelson, S. Dumais, & J. Olson (Eds.), Celebrating Independance (pp. 330-336). (Conference on Human Factors in Computing Systems—Proceedings). Publ by ACM. (10 pages).
"Computer Dictionary" Microsoft, Fourth Edition, Published by Microsoft Press, 1999 (8 pages).
"C++ Program Design: An introduction to Programming and Object-Oriented Design" J.P. Cohoon et al., 3rd Edition, McGraw Hill, 2002 (50 pages).
"A Mobile System for Distributed Multimedia Applications", Massachusetts Institute of Technology, Dept. of Electrical Engineering and Computer Science, 1996, http://hdl.handle.net/1721.1/10866.
Decision of Refusal Japanese Patent Application No. 2015-235234, dated Mar. 14, 2017, with English translation.
Touchpad remote control | product lineup | The personal computer television—Internet AQUOS: A sharp and Internet Archive, Mar. 20, 2007 URL: http://web.archive.org/web/20070320153603/http://www.sharp.co.jp/i-aquos/products/ax120s/remocon.html w/English language translation.

(56) References Cited

OTHER PUBLICATIONS

PC menu | Product lineup | Personal computer television. Internet AQUOS: A sharp and internet. Archive, Mar. 21, 2007 URL: http://web.archive.org/web/20070322013030/http://www.sharp.co.jp/i-aquos/products/ax120s/pc-menu.html w/English language translation.

Notice of Allowance mailed Aug. 10, 2017, issued in corresponding U.S. Appl. No. 15/446,181.

Japanese Office Action issued in Japanese Patent Application No. JP 2007-248353 dated Oct. 2, 2012.

Shih-Hsiang Lo, Controlling Digital TV Set-Top Box with Mobile Device via an IP Network, May 20, 2006, IEEE fellow, pp. 935-942.

Takuji Imai, "Sony demonstrated a new feature of DLNA 1.5, in which images are thrown and caught on PSP and liquid crystal TV," issued on Jan. 12, 2006, Nikkei Electronics, w/ English translation.

European Search Report issued in European Patent Application No. EP 08252339.0-2223/2061230, dated Apr. 24, 2009.

"Google Brower Sync," Afterdawn.com Software, online, Jun. 19, 2007 XP0025200224, http://www.afterdawn.com/software/plug-ins/other_plug-ins_google_browser_sync.cf.

Korean Office Action issued in Korean Patent Application No. 10-2008-0067190, dated May 26, 2010.

Japanese Office Action, w/ partial English translation thereof, issued in Japanese Patent Application No. JP 2007-248353 dated Jan. 4, 2012.

Japanese Office Action, w/ partial English translation thereof, issued in Japanese Patent Application No. JP 2007-248353 dated Mar. 13, 2012.

Entire Prosecution of U.S. Appl. No. 13/489,877 to Matsubara et al. entitled "Portable Terminal, Information Processing Apparatus, Content Display System and Content Display Method".

Japanese Office Action issued in Japanese Application No. 2012-268954 dated Sep. 17, 2013.

Corrected Notice of Allowability issued in U.S. Appl. No. 14/029,548 dated Oct. 31, 2014, 15 pages.

Notification of Reasons for Refusal Japanese Patent Application No. 2015-235234 dated Nov. 1, 2016 with full English translation.

Extended European Search Report EP Application No. 16201316.3 dated Apr. 7, 2017.

Entire Prosecution of U.S. Appl. No. 12/170,938 to Matsubara et al. entitled "Portable Terminal, Information Processing Apparatus, Content Display System and Content Display Method".

Entire Prosecution of U.S. Appl. No. 14/029,548 to Matsubara et al. entitled "Portable Terminal, Information Processing Apparatus, Content Display System and Content Display Method".

Non-Final Office Action U.S. Appl. No. 14/501,621 dated Mar. 10, 2015.

Notice of Allowance U.S. Appl. No. 14/501,621 dated Jul. 17, 2015.

Non-Final Office Action U.S. Appl. No. 14/919,367 dated Feb. 23, 2016.

Notice of Allowance U.S. Appl. No. 14/919,367 dated Oct. 7, 2016.

Office Action issued in U.S. Appl. No. 15/402,433, dated May 1, 2017.

Notice of Allowance issued in U.S. Appl. No. 15/402,433, dated Sep. 19, 2017.

Office Action issued in U.S. Appl. No. 15/446,181, dated May 1, 2017.

Notice of Allowance issued in U.S. Appl. No. 15/446,118, dated Aug. 10, 2017.

European Search Report issued in corresponding European Application No. 16201316.3, dated Jan. 2, 2018.

Non-Final Office Action issued in related parent U.S. Appl. No. 15/845,680, mailed on Mar. 22, 2018.

Notice of Allowance issued in related parent U.S. Appl. No. 15/845,680, mailed on Jun. 27, 2018.

Notice of Allowance issued in related parent U.S. Appl. No. 15/595,057, mailed on Jun. 24, 2020.

Written Opinion regarding validity of the European patent EP2403266B1 from Swedish Patent Office, dated Dec. 3, 2020.

"AV Home Network Device Control Technology UPnP AV, Realizing a world where you can enjoy video and audio anywhere in your home without complicated settings," Toshiba review vol. 62, No. 6 (2007), with English translation.

Y. Sonoda, "Special Feature New Trend in Device Connection Regarding DLNA Standard and Its Application (Part 2)," JAS Journal 2006, vol. 46, No. 10, with English translation.

ThinkPad T61 and T61p (14.1-inch) Hardware Maintenance Manual, Fifth Edition, Sep. 2011 (2007).

Extended European Search Report issued in corresponding European Application No. 22187322.7, dated Jan. 20, 2023 (14 pages).

Borman S. et al., "Spatial Resolution Enhancement of LowResolution Image Sequences A Comprehensive Review with Directions for Future Research" Laboratory for Image and Signal Analysis, University of Notre Dame, Jul. 8, 1998 (64 pages).

Bovik, Al, "Handbook of Image & Video Processing" 2nd Edition, 2005 (1430 pages).

Bovik, Al, "Handbook of Image & Video Processing" 1st Edition, 2000 (974 pages).

Non-Final Office Action received in U.S. Appl. No. 17/847,798, dated Jul. 7, 2023.

Final Office Action received in U.S. Appl. No. 17/847,798, dated May 22, 2024.

Non-Final Office Action received in U.S. Appl. No. 17/847,798, dated Nov. 4, 2024.

Notice of Allowance received in U.S. Appl. No. 17/847,798, dated Jul. 10, 2025.

Myers et al., "Taking Handheld Devices to the Next Level," IEEE Computer Society, Dec. 2004, pp. 36-43.

Myers et al., "Using Hand-Held Devices and PCs Together," To Appear in CACM, Human Computer Interaction Institute School of Computer Science, Aug. 9, 2001, pp. 1-15.

Nichols et al., "Automatically Generating Interfaces for Multi-Device Environments," Human Computer Interaction Institute School of Computer Science, Dec. 31, 2002.

Rekimoto et al., "Proximal Interactions: A Direct Manipulation Technique for Wireless Networking," Human-Computer Interaction—Interact-03, Jan. 2003.

Robertson et al., "Dual Device User Interface Design: PDAs and Interactive Television," CHI 96 Vancouver, Applied Research, Collaborative Systems Group US West Advanced Technologies, Apr. 1996, pp. 79-86.

Yam, "Projecting PowerPoint Presentations with a PDA," Computers in Radiology, Apr. 2005, pp. 1356-1359.

Yang et al., "Autonomous and Universal Remote Control Scheme," IEEE, Nov. 2002, pp. 2266-2271.

Vila et al., "A PDA-based interface for a computer supported educational system," IEEE Computer Society, Sep. 2003, 5 pages.

Newman et al., "Supporting End-User Configuration of Ubiquitous Computing Environments," Jun. 2002.

"Specification of the Bluetooth System" Bluetooth Special Interest Group, v1.0 A, Jul. 26, 1999 (Submitted in 8 Parts).

"Wireless Application Protocol White Paper," Wireless Application Protocol Forum, Wireless Internet Today, Jun. 2000 19 pages.

Newman, "Supporting the unremarkable: experiences with the obje Display Mirror," Pers Ubiquit Comput, May 2006.

"Product Specifications Reference Lenovo ThinkPad Notebooks 2005 to 2013—withdrawn," Lenovo, Dec. 2013, version 447 (Submitted in 12 Parts).

Song et al., "Browser State Repository Service", Pervasive Computing, Pervasive 2002, p. 253-266.

"Wireless Application Protocol WAP 2.0 Technical White Paper" Wireless Application Protocol Forum, Jan. 2002, 13 pages.

* cited by examiner

| No. | OPERATION OBJECT | OPERATION |
|---|---|---|
| 1 | TEXT BOX 1 | CHARACTER STRING "-----" INPUT |
| 2 | TEXT BOX 2 | CHARACTER STRING "--------" INPUT |
| 3 | BUTTON 1 | CLICK |
| 4 | NONE | URL "--------" DISPLAY |
| 5 | LIST BOX | ITEM "----" SELECT |
| 5 | BUTTON 2 | CLICK |
| 4 | NONE | URL "--------" DISPLAY |

1000

| No. | OPERATION OBJECT | OPERATION |
|-----|------------------|-----------|
| 1 | CONTENT 1 | COORDINATES "··, ··" SELECT |
| 2 | CONTENT 1 | COORDINATES "··, ··" SELECT |
| 3 | NONE | URL "········" DISPLAY |

1100

| HEADER DATA | URL "········" | OPERATION HISTORY |
|-------------|----------------|-------------------|

1101         1102         900,1000

PORTABLE TERMINAL, INFORMATION PROCESSING APPARATUS, CONTENT DISPLAY SYSTEM AND CONTENT DISPLAY METHOD

CROSS REFERENCE TO RELATED APPLICATIONS

This application is a continuation of U.S. application Ser. No. 17/847,798, Filed Jun. 23, 2022, which is a continuation of U.S. application Ser. No. 17/386,496, filed Jul. 27, 2021, now U.S. Pat. No. 12,108,103, which is a continuation of U.S. application Ser. No. 17/031,574, filed Sep. 24, 2020, now U.S. Pat. No. 11,477,508, which is a continuation of U.S. application Ser. No. 16/595,057, filed Oct. 7, 2019, now U.S. Pat. No. 10,951,940, which is a continuation of U.S. application Ser. No. 16/299,732, filed Mar. 12, 2019, now U.S. Pat. No. 10,484,733, which is a continuation of U.S. application Ser. No. 16/143,237, filed Sep. 26, 2018, now U.S. Pat. No. 10,271,086, which is a continuation of U.S. application Ser. No. 15/845,680, filed on Dec. 18, 2017, now U.S. Pat. No. 10,116,984, which is a continuation of U.S. application Ser. No. 15/402,433, filed on Jan. 10, 2017, now U.S. Pat. No. 9,883,225, which is a continuation of U.S. application Ser. No. 14/919,367, filed on Oct. 21, 2015, now U.S. Pat. No. 9,578,369, which is a continuation of U.S. application Ser. No. 14/501,621, filed on Sep. 30, 2014, now U.S. Pat. No. 9,197,917, which is a continuation of U.S. application Ser. No. 14/029,548, filed on Sep. 17, 2013, now U.S. Pat. No. 8,892,688, which is a continuation of U.S. application Ser. No. 13/489,877, filed on Jun. 6, 2012, now U.S. Pat. No. 8,549,109, which is a continuation of U.S. application Ser. No. 12/170,938, filed on Jul. 10, 2008, now U.S. Pat. No. 8,214,459, which claims the benefit of Japanese Application No. 2007-248353 filed Sep. 26, 2007, the entire contents of each of which are hereby incorporated by reference.

BACKGROUND OF THE INVENTION

The present invention relates to a portable terminal, an information processing apparatus, a content display system, and a content display method.

Cellular phones capable of browsing internet sites and television (TV) programs have come into wide use today. On the other hand, there have been increasingly employed television sets capable of connecting to networks. In this environment, a technique in which a content received by a cellular phone is viewed by a television set with higher usability and a technique in which a cellular phone is employed as a remote control device to operate a television set are under discussion.

For example, JP-A-2006-286855 describes a cellular phone including a broadcast receiving function. The cellular phone transmits a history of viewed programs and playback indication signals thereof to a video playback device. According to the cellular phone, a program which the user viewed outside his or her house can be again viewed on a large screen after returning home. It is also possible that when the user viewed part a program outside home during a free period of time, the user can view its subsequent part, parts before and after the viewed part, or the entire program from the start point to the end point thereof after returning home by using a recording and reproducing device in the house.

JP-A-2005-135346 describes a technique for use in a system including a cellular phone, an information processing apparatus, and a display. When mail data including Uniform Resource Locator (URL) information is received, the cellular phone transfers the mail data via radio communication to the information processing apparatus. On receiving the mail data, the information processing apparatus displays the mail data on the display. If an operation is conducted for the URL information in the mail data, an operation is conducted to access a radio communication network other than a network used for the radio communication on the basis of the URL information, and resultantly obtained information is displayed on the display.

JP-A-2006-338406 describes a technique in which a communication terminal device including another function is ordinary employed as a remote control device to remotely control other communication terminal devices.

Additionally, JP-A-2007-74265 describes a videoconference system using a cellular phone connected via the internet to a videoconference server to communicate information with the server and a display device capable of, when connected via a communication function to the cellular phone, displaying the information. The videoconference system controls devices connected thereto via the videoconference server and a network. The videoconference system includes an information display module to display on a first display of the cellular phone a first videophone screen on which the information is displayed using letters. The information display module also displays on a second display of the display device a second videophone screen on which image information included in the information communicated as above is displayed. JP-A-2007-74265 describes a system in which a monitor camera is remotely controlled by a cellular phone, and a video image produced from the camera is displayed on a display screen of a Personal Computer (PC).

SUMMARY OF THE INVENTION

The portable terminal described in JP-A-2006-286855 is configured to meet the desires such as a desire in which a program viewed by the user outside his or her house is to be again viewed on a large screen after returning home and a desire to view, for part of a program viewed by the user outside his or her house during a free period of time, its subsequent part, parts before and after the viewed part, or the entire program from the start point to the end point thereof after returning home by using a recording and reproducing device in the house (paragraph 0006). Specifically, the portable terminal is constructed such that a list of programs viewed in the past is displayed (FIG. 7) and a program selected therefrom is reproduced by the video playback device.

However, there exists a desire in which a content just being viewed by a portable terminal is to be passed to a video playback device to continuously viewed the content thereon. This corresponds to, for example, a situation as follows. In a room in which the video playback device is installed, the user is viewing a program on a portable terminal and desires to pass the viewing of the program to the video playback device.

In this case, according to the portable terminal described in JP-A-2006-286855, it is required that the user terminates the viewing on the portable terminal and then selects from the list of programs viewed in the past a program to be reproduced by the video playback device. This leads to an increase in the number of operation steps depending on cases.

According to the mail terminal described in JP-A-2005-135346, it is possible, by transmitting a URL, for the information processing apparatus or device to receive information indicating whether or not an internet site has been viewed by the cellular phone. However, in use of the mail terminal described in JP-A-2005-135346, if it is desired to view an internet site on the information processing device side, it is required that the user operates the information processing device. This leads to an increase in the number of operation steps in some cases.

In JP-A-2006-338406 and JP-A-2007-74265, description has not been given of the continuation of the viewing of a content on a communication terminal device in which the viewing of the content on the communication terminal is passed to a television set or the like. Therefore, in a situation wherein the viewing of a content just being conducted on the communication terminal device is to be continued on the video playback device, it is required, even if a cellular terminal is used as a remote control device, that the user terminates the viewing on the cellular terminal and then reproduces the video on the video playback device. This leads to an increase in the number of operation steps depending on cases.

That is, description has not been given of an idea to achieve a smoother cooperative operation when the viewing of a content just being conducted on the portable terminal is to be relayed or passed to the video playback device.

It is therefore an object of the present invention to provide a portable terminal, an information processing apparatus, a content display system, and a content display method wherein viewing of a content on a portable terminal is smoothly passed to an information processing apparatus.

To achieve the object according to the present invention, there is provided a portable terminal including a receiving unit which receives content information, an external device communication unit which conducts communication with an external information device, a display unit which displays the content information received by the receiving unit, an acquiring unit which acquires identification information identifying the content information displayed by the display unit, an operation unit which receives an operation indication from a user, and a control unit which conducts control such that if a transmission indication of the identification information is received by the operation unit while the content information is being displayed, the identification information acquired by the acquiring unit is transmitted to the external information device and the display of the content information by the display unit is terminated.

According to the present invention, there is also provided an information processing apparatus including an input unit which inputs content information, a communication unit which conducts communication with a portable terminal, a display unit which displays the content information inputted by the input unit, a control unit which conducts control such that if the communication unit receives identification information identifying second content information displayed on the portable terminal from the portable terminal while the display unit is displaying first content information, the input unit inputs the second content information corresponding to the identification information to be displayed on the display unit, and the display unit displays the second content information in place of the first content information, the control unit conducting control such that if the communication unit receives an indication signal indicating termination of the display of the second content information by the display unit, the display of the second content information is terminated and the display of the first content information is resumed.

BRIEF DESCRIPTION OF THE DRAWINGS

These and other features, objects and advantages of the present invention will become more apparent from the following description when taken in conjunction with the accompanying drawings wherein:

FIG. 9 is a table showing a data layout of an operation history in the third embodiment;

DESCRIPTION OF THE EMBODIMENTS

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

First Embodiment

Description will now be given of an embodiment including as an example a mobile terminal 101 as a portable terminal, an internet connection terminal 100, and an internet site as a content.

Figure 1:
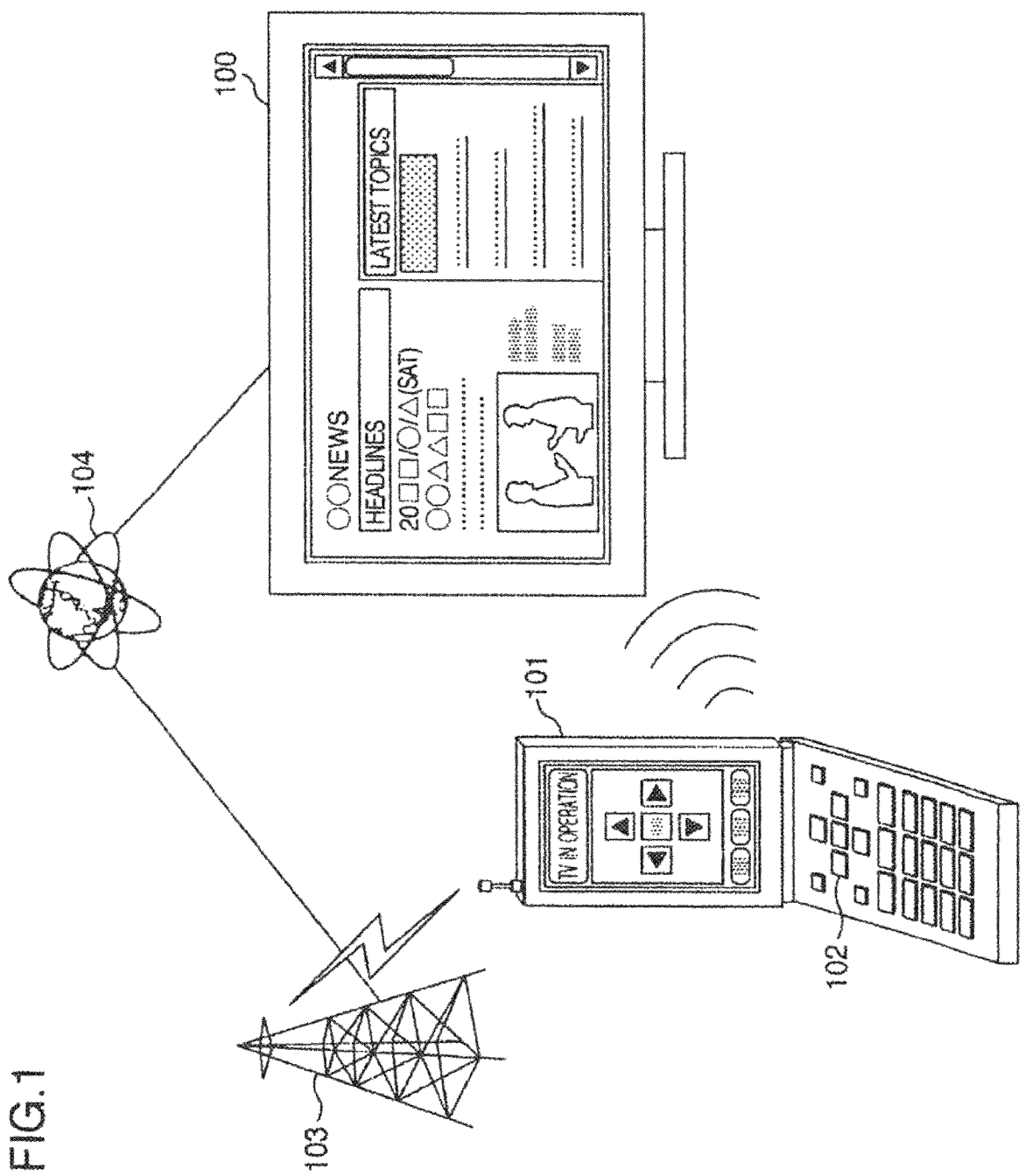
FIG. 1 is a schematic diagram showing an operation environment of an internet connection terminal and a mobile terminal in first and second embodiments.

In the embodiment, the internet connection terminal 100 and the mobile terminal 101 are terminals capable of connecting to the internet to display a homepage provided by an internet site. FIG. 1 shows an outline of associated facilities and connection environments for the terminals 100 and 101 to connect to the internet 104. Specifically, the terminal 100 connects to the internet 104 and the terminal 101 connects thereto using an input unit 102 and a base station 103. The mobile terminal 101 is a portable information processing terminal, for example, a cellular phone (abbreviated to "cellular"), a Personal Digital Assistant (PDA), or a smart phone.

The input unit 102 is an input device of the mobile terminal 101 and includes, for example, a plurality of buttons. The user conducts an operation for the mobile terminal 101 using a key, a button, and a dial of the input unit 102.

The base station 103 is a base station with which the mobile terminal 101 conducts radio communication to connect to the internet.

The internet 104 conceptually represents a set of Web servers and various services on the internet and is connected to the internet connection terminal 100 and the mobile terminal 101. The mobile terminal 101 connects via the base station 103 to the internet 104.

Figure 2:
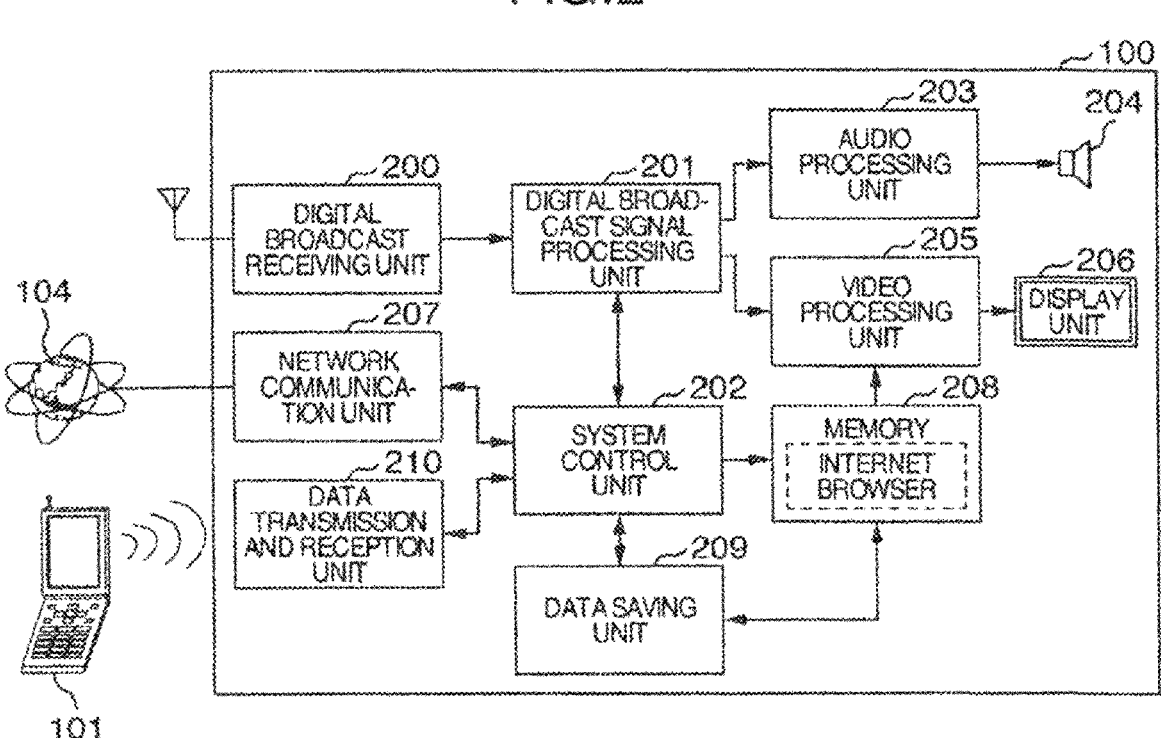
FIG. 2 is a block diagram showing a configuration of a first embodiment of an internet connection terminal.

The internet connection terminal 100 is, for example, a television (TV) set, a SetTop Box (STB), or a home server for Digital Living Network Alliance (DLNA) and has a function to output video signals and a function to connect to the internet. The terminal 100 is capable of connecting to the internet to display a homepage. The terminal 100 also enables the user to view digital broadcast programs delivered using a ground wave, Broadcasting by Satellite (BS), Communication Satellite (CS), the internet, and the like. As FIG. 2 shows, the internet connection terminal 100 includes a digital broadcast receiving unit 200, a digital broadcast signal processing unit 201, a system control unit 202, an audio processing unit 203, a speaker 204, a video processing unit 205, a display unit 206, a network communication unit 207, an internet browser 208, a data saving unit 209, and a data transmitting and receiving unit 210.

The digital broadcast receiving unit 200 is a circuit which receives desired broadcast data via an antenna or a cable and restores, based on received signals, the broadcast data into data to be digitally processed by the digital broadcast signal processing unit 201.

The digital broadcast signal processing unit 201 includes, for example, a signal separator to conduct demultiplexing of a signal and a decoder to conduct decoding of a signal. The processing unit 201 receives digital broadcast data from the receiving unit 200, separates audio data and video data therefrom, converts the audio data into data of a data format to be processed by the audio processing unit 203 and converts the video data into data of a data format to be processed by the video processing unit 203, and outputs the converted data items to the audio and video processing units 203 and 205, respectively.

The system control unit 202 includes, for example, a microprocessor and controls operations of processing units required to reproduce digital broadcast and those required to access the internet.

The audio processing unit 203 includes, for example, an Analog-to-Digital (AD) converter. The processing unit 203 converts digital audio data from the digital broadcast signal processing unit 201 into analog audio data to output the data to the speaker 204.

The speaker 204 receives the analog audio data from the audio processing unit 203 to produce sounds from the data.

The video processing unit 205 includes, for example, processing devices such as an Application Specific Integrated Circuit (ASIC), a Field Programmable Gate Array (FPGA), and a Micro Processing Unit (MPU). The unit 205 receives video data from the digital broadcast signal processing unit 201 and the internet browser 208, which will be described later, converts the data into data to be processed by the display unit 206, and delivers the data thereto.

The display unit 206 includes, for example, a display device such as a liquid-crystal display, a plasma display, or the like. The display unit 206 includes a display panel, a panel control circuit, and a panel control driver, and displays an image on the display panel using data supplied from the video processing unit 205. If the internet connection terminal is a settop box or a home server for DLNA, a video signal including, for example, data in a Red, Blue, and Green (RGB) format is outputted to an external display device, without using the display unit 206.

The network communication unit 207 includes, for example, a communication module capable of connecting to the internet. According to a request from the system control unit 202, the network communication unit 207 communicates predetermined data with the internet 104.

The internet browser 208 is software which operates according to an indication from the system control unit 202 and which conducts display control and management for contents received via the network communication unit 207 from the internet 104. The system control unit 202 reads the browser 208 from the data saving unit 209 to store it in a memory and controls the browser 208. The browser 208 may be implemented using a dedicated circuit.

A URL to be displayed on the internet browser 208 is received via the data transmitting and receiving unit 210 or the network communication unit 207, which will be described later, or is inputted by the user from a remote control device, not shown.

The data saving unit 209 includes an information recording device, e.g., a flash memory, an optical disk, a magnetic disk or the like to store program information of received digital broadcast programs, contents obtained from the internet 104, and data necessary for operations in respective processing units.

The data transmitting and receiving unit 210 includes a communication device which conducts radio communication with an external terminal such as the mobile terminal 101 according to standards of, for example, Bluetooth or the wireless Local Area Network (LAN). The unit 210 outputs data and signals received through the communication, to the system control unit 202.

Figure 3:
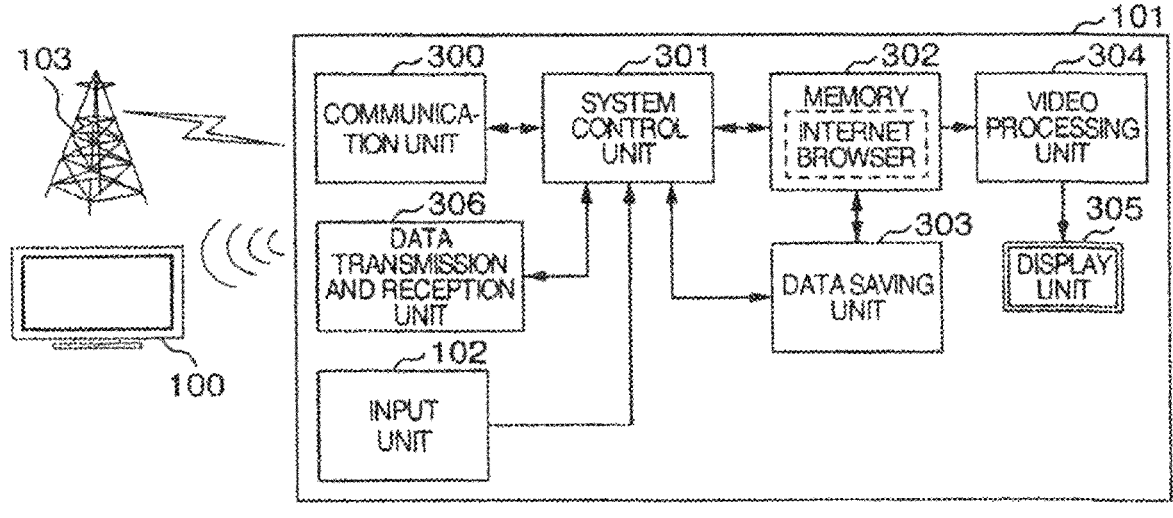
FIG. 3 is a block diagram showing a configuration of a first embodiment of a mobile terminal.

As FIG. 3 shows, the mobile terminal 101 includes a communication unit 300, a system control unit 301, an internet browser 302, a data saving unit 303, a video processing unit 304, a display unit 305, and a data transmitting and receiving unit 306.

The communication unit 300 includes a function to conduct radio communication with the base station 103 and communicates necessary data according to a request from the system control unit 3. The unit 300 includes, for example, a transmitting and receiving device such as a front-end module.

The system control unit 301 includes an information processing device, for example, an MPU or a microprocessor and controls processing units required to access the internet and processing units required to conduct operations for another mobile terminal 101.

The internet browser 302 is software which conducts management and display control for contents received from the internet 104 via the communication unit 300 and the base station 103, according to an instruction from the system control unit 301. The system control unit 301 reads the browser 301 from the data saving unit 303 to store it in a memory and controls the browser 301. The browser 302 may be implemented using a dedicated circuit. It is assumed in the configuration that a URL of an internet site is obtained from the input unit 102 or is received via the communication unit 300 or the data transmitting and receiving unit 306, which will be described later.

The data saving unit 303 includes a flash memory and stores contents obtained from the internet 104 and data necessary for operations in respective processing units.

The video processing unit 304 includes a processing device such as an MPU. The unit 304 converts a content supplied from the internet browser 302 into data to be processed by the display unit 305 and delivers the data thereto.

The display unit 305 includes, for example, a display panel, a panel control circuit, and a panel control driver and displays an image on the display panel using data supplied from the video processing unit 304.

The data transmitting and receiving unit 306 conducts radio communication with an external terminal such as the internet connection terminal 100 according to standards of, for example, Bluetooth (registered trademark) or the wireless LAN. The unit 210 outputs data and signals received through the communication, to the system control unit 301.

Figure 4:
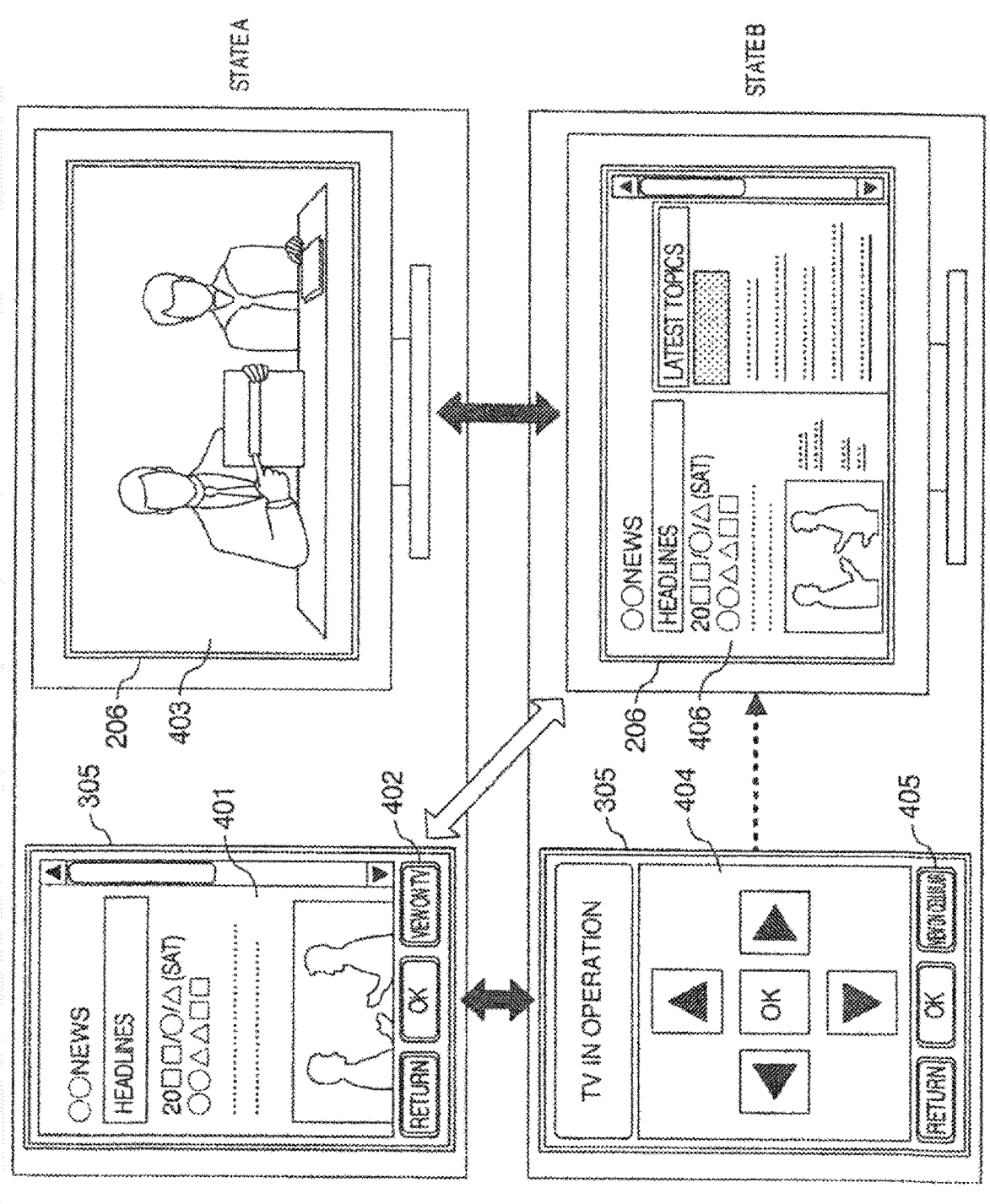
FIG. 4 is a diagram showing a transition example of screen display on an internet connection terminal and a mobile terminal in the first to third embodiments.

In operation of the internet connection terminal 100 and the mobile terminal 101, an internet site being displayed on the mobile terminal 101 can be displayed on the internet connection terminal 100. Also, the user can operate the internet connection terminal 100 by use of the mobile terminal 101. FIG. 4 shows an outline of screen layouts and screen transitions on the terminals 100 and 101 in the configuration including state A, a screen display 401, a button display 402, a screen display 403, state B, a screen display 404, a button display 405, and a screen display 406.

State A shows states of screens on both terminals 100 and 101 when the user is conducting an internet browsing operation using the mobile terminal 101. The screen display 401 is an example when an internet site is displayed on the display unit 305 of the mobile terminal 101. The button display 402 is an icon displayed in the display unit 305 of the mobile terminal 101 and displays a relationship between button display 402 and an operation conducted in response to depression of an associated button. This also applies to the button display 405. In the example, when the user presses a selection button of the button display 402 using the input unit 102, the system executes change-over processing to pass the display of the internet site to the internet connection terminal 100. The button is ordinarily assigned with another function of the cellular phone. The button may be configured such that the function is assigned in the change-over processing when the internet site is being displayed on the mobile terminal 101. The screen display 403 is an example in which a TV program is displayed on the display unit 206 of the internet connection terminal 100.

State B shows states of screens on both terminals 100 and 101 when the user is conducting an internet browsing operation using the internet connection terminal 100. The screen display 404 is an example when an operation guide is displayed on the display unit 305 of the mobile terminal 101 to operate the internet connection terminal 100 from the mobile terminal 101. In a state wherein the screen display 404 is being displayed on the display unit 305, the mobile terminal 101 can conduct operation for the internet connection terminal 100. The screen display 406 is an example in which an internet site is displayed on the display unit 206 of the internet connection terminal 100. Also, the screen display 406 shows a state in which a homepage of the internet site displayed on the mobile terminal 101 in the screen state 401 is displayed on the internet connection terminal 100. In the example, when the user presses a selection button of the button display 405 using the input unit 102, the system executes change-over processing to change the display of the internet site from the internet connection terminal 100 to the portable terminal 101.

In this situation, if the display operation changes from state A to state B, the internet site display on the mobile terminal 101 is terminated. if the display operation changes from state B to state A, the internet site display on the internet connection 100 is terminated.

In place of the button displays 402 and 405 and the buttons associated therewith, there may be arranged an input device of touch panel type.

Next, description will be given of operations in the internet connection terminal 100 and the mobile terminal 101 configured as above by referring to FIGS. 2 to 4 and the flowchart of FIG. 5.

During reception or playback of a digital broadcast, if the internet connection 100 receives a URL of an internet site sent by radio from the mobile terminal 101 as a result of an operation by the user, the internet connection terminal 100 displays an internet site indicated by the URL. Thereafter, the internet connection terminal 100 accepts an operation for the terminal 100 from the mobile terminal 101.

First, referring to FIG. 2, description will be given of an operation in which the internet connection terminal 100 conducts reception and playback of a digital broadcast.

Assume that the user carries out an operation to send an indication to the internet connection terminal 100, the indication requesting start of reception and playback of a digital broadcast, by using, for example, a remote control device, not shown.

In response to the indication, the terminal 100 converts the signal received by the data transmitting and receiving unit 210 from the remote control device into predetermined information and notifies the information to the system control unit 202. The control unit 202 delivers an indication to start reception processing to the digital broadcast receiving unit 200, digital broadcast signal processing unit 201, the audio processing unit 203, and the video processing unit 205.

In response to the indication from the system control unit 202, the digital broadcast receiving unit 200 decodes signals obtained from the antenna and the cable to produce data to be digitally processed by the digital broadcast processing unit 201 and outputs the data thereto.

The processing unit 201 separates video data and audio data from the received data and converts the video data and the audio data respectively into a predetermined video signal and a predetermined audio signal. In this situation, to output the video and audio signals with a correspondence established therebetween, these signals are outputted at synchronized timing.

The audio processing unit 203 converts the audio signal from the processing unit 201 into a signal suitable for an input to the speaker 204 and outputs the signal thereto. As a result, the speaker 204 produces sounds.

On the other hand, the video processing unit 205 converts the video signal from the processing unit 201 into a signal suitable for an input to the display unit 206 and outputs the signal thereto. As a result, the display unit 206 displays an associated image.

Through the sequence of operations, the internet connection terminal 100 conducts the reception and playback of the digital broadcast.

Referring now to FIG. 2, description will be given of an operation in which the terminal 100 accesses the internet 104 to display an internet site.

Assume that the user sends a URL of an internet site by radio from the input unit 102 or the like of the mobile terminal 101 to the internet connection terminal 100, which will be described later. The terminal 100 receives data through the radio communication by the data transmitting and receiving unit 210 and notifies the URL obtained from the data to the system control unit 202.

The system control unit 202 outputs the URL to the internet browser 208. The browser 208 having received the URL accesses via the system control unit 202 and the network communication unit 207 an internet site indicated by the URL to thereby receive data of the homepage of the internet site.

The network communication unit 207 accesses the internet 104 using a communication protocol of, for example, HyperText Transfer Protocol (HTTP) to receive the homepage data of the internet site and outputs the data via the system control unit 202 to the internet browser 208. The browser 208 constructs an image to be displayed as a homepage using the data, converts the image into a video signal to be inputted to the video processing unit 205, and outputs the signal thereto.

The video processing unit 205 converts the video signal from the browser 208 into a signal suitable for an input to the display unit 206 and outputs the signal thereto. The display unit 206 resultantly displays the homepage image. During the operation, if there exists data to be temporarily stored in the terminal, the internet browser 208 saves the data in the data saving unit 209 according to necessity.

If the user conducts a predetermined operation when the internet site is being displayed as above, the mobile terminal 101 transmits by radio the URL of the internet site to the internet connection terminal 100 and then enters a state capable of operating the internet connection terminal 100. This enables the user to operate the internet connection terminal 100 from the mobile terminal 101.

Referring now to FIG. 3, description will be given of an operation in which the mobile terminal 101 accesses the internet 104 via the base station 103 to display an internet site.

Assume that the user conducts a predetermined operation for the mobile terminal 101 via the input unit 102 of the mobile terminal 101 to indicate display of the internet site existing in the mobile terminal 101.

In response to the indication from the user received via the input unit 102, the system control unit 301 of the mobile terminal 101 activates the internet browser 302 to display the internet site. The control unit 301 accesses the internet site which the browser 302 displays via the communication unit 300 immediately after the activation, and issues an indication to the communication unit 300 to receive data of the homepage of the internet site.

The communication unit 300 conducts radio communication with the base station 103 to access the internet 104 via the base station 103 and receives the homepage data of the internet site. Also, the communication unit 300 outputs the data to the internet browser 302. When the data is received, the browser 302 constructs an image to be displayed as a homepage using the data and converts the image into a video signal to be inputted to the video processing unit 304 to output the signal thereto. The processing unit 304 converts the video signal from the browser 302 into a signal to be inputted to the display unit 305 to output the signal thereto. As a result, the display unit 305 displays an image of the homepage. During the operation, if there exists data to be temporarily stored in the terminal, the internet browser 302 saves the data in the data saving unit 303 according to necessity.

Similarly, the mobile terminal 101 obtains a URL as an input from the user or a URL included in the hyper link and controls operation to access an internet site indicated by the URL. The system control unit 301 controls operation to store the URL of the internet site displayed by the browser 302 in the data saving unit 303.

Next, description will be given in detail of an operation using the internet connection terminal 100 and the mobile terminal 101. Specifically, an internet site to be displayed on the mobile terminal 101 is displayed on the internet connection terminal 100. After the display of the internet site, the internet connection terminal 100 is operated from the mobile terminal 101. The operation is explained using FIGS. 4 and 5.

Figure 5:
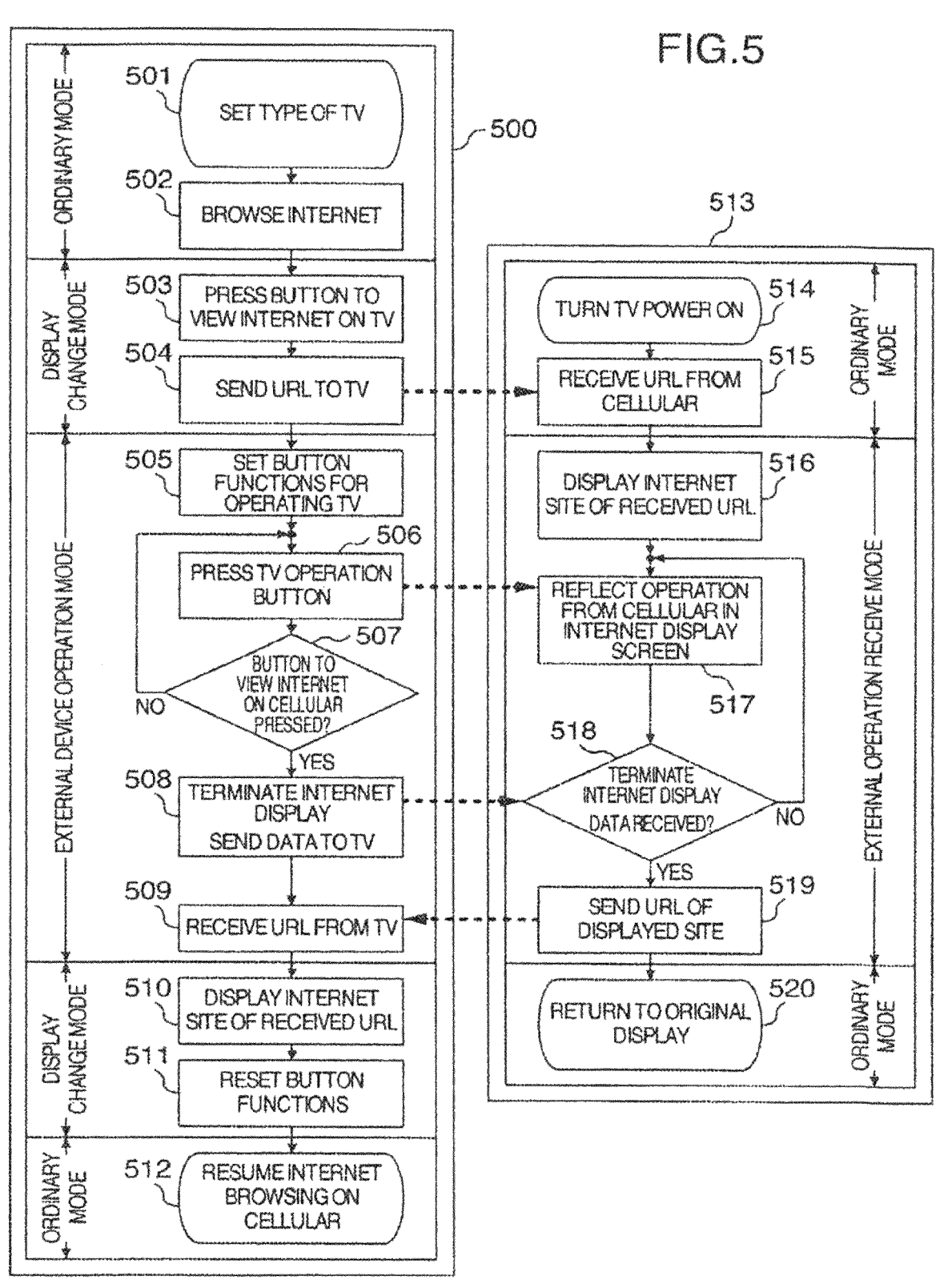
FIG. 5 is a flowchart for explaining operations of an internet connection terminal and a mobile terminal in the first embodiment.

In FIG. 5, operations respectively of the mobile terminal 101 and the internet connection terminal 100 are shown in frames 500 and 513, respectively. In association with explanation of respective operation flows in the frames 500 and 513, description will be given of the operation flows in the terminals 101 and 100 and a relationship therebetween. Assume in the description that a cellular phone is employed as an example of the mobile terminal 101 and a television set including an internet connecting function is used as an example of the internet connection terminal 100.

First, by using, for example, the input unit 102, the user beforehand sets a type of the television set for the internet browsing to the cellular phone, which will be described later, by designating a maker and a model number using a predetermined setting screen (step 501). The number such as the model number, the operation, and a signal and information to be transmitted are stored in the data saving unit 303 with a correspondence established therebetween. The control unit 301 establishes a correspondence between the operation stored in the data saving unit 303 and the information to be transmitted. This resultantly sets a command to transmit the information to the TV set. After the setup of the command, the system enters a state in which the cellular phone is capable of transmitting a command recognizable by the TV set thereto.

The user powers the TV set by conducting an ordinary operation, and the TV set receives and reproduces a broadcast received from the digital broadcast receiving unit 200 as described above (step 514). In step 514, the user operates the TV set as a single device. This state is referred to as an ordinary mode of the TV set. The state in which the TV has been powered indicates a state in which at least a main power source thereof is on.

The user conducts a predetermined operation to start displaying an internet site on the cellular phone. As a result, an internet site is displayed on the screen display 401 so that the user browse the internet site (step 502).

In steps 501 and 502, the user operates the cellular phone as a single device. This state is referred to as an ordinary mode of the cellular phone.

Assume that the user attempts, during the internet site browsing, to browse the internet site by use of the TV set. In this situation, the user operates the input unit 102 to select the button 402 in the display unit 305 of the cellular phone (step 503). Then, the cellular hone enters a display change mode to execute processing to change the display of the internet site to the TV set.

When the cellular phone enters the display change mode, the system control unit 301 of the cellular phone sends the URL of the internet site on the display via the data transmitting and receiving unit 306 to the TV set (step 504). After the URL transmission or in concurrence with therewith, the system control unit 301 controls the display unit 305 and the like to terminate the display of the internet site on the cellular phone. Also, the cellular phone may be configured such that the cellular phone transmits together with the URL a signal indicating the internet site display to the TV set.

The TV set receives the URL via the data transmitting and receiving unit 210 from the cellular phone (step 515), connects to the internet site indicated by the URL in the procedure described above, and displays the internet site on the display unit 206 as indicated by the screen display 406 (step 516). As a result of step 516, the TV set enters a state to receive operation from the cellular phone. This mode is referred to as an external operation receive mode. Through the operation of step 516, the display on the TV set changes from the old content to a content corresponding to the URL from the cellular phone.

On the other hand, the cellular phone enters, after the transmission of the URL, a state in which the system control unit 301 is capable of operating the TV set using part of the input unit 102, which will be described later. This mode is referred to as an operation change mode. The display unit 305 presents a display to inform the user of operations which can be conducted by pressing keys as shown, for example, in the screen display 404 (step 505).

In this state in which the TV set can be operated if the user presses a desired key of the input unit 102, data which indicates an operation for the TV set and which can be interpreted by the TV set designated in step 501 is sent to the TV set. The data includes data items almost the same as those of data sent from a remote control device of the TV set. Therefore, in a situation wherein it is desired to move a selection item of an internet site being displayed on the TV set or to determine a selection item, if the user operates the input unit 102 of the cellular phone to press a key corresponding to an operation information item shown in the screen display 404, the cellular phone sends an information item and a signal indicating an indication of the operation to the TV set (step 506). As a result of this step, the cellular phone serves as a remote control device of the TV set. The operation of this step is carried out, for example, under supervision of the system control unit 301.

When the data transmitting and receiving unit 210 receives the information and the signal of the operation indication such as "move" or "select" from the cellular phone, the TV set reflects, under control of the system control unit 201, the information of the indication in the screen display 406 displaying the internet and in the operation of the browser 208 (step 517).

If the user desires to return from the state in which the user browses the internet site on the TV set to a state in which the user browses the internet site on the cellular phone, the user conducts an operation to select an item of the button display 405 in the display unit 305 of the cellular phone (step 507). Then, the cellular phone sends data indicating termination of the internet display via the data transmitting and receiving unit 306 to the TV set (step 508). After or in concurrent with the URL transmission, the internet control unit 202 controls, for example, the display unit 206 to terminate the internet site display on the TV set.

When the data transmitting and receiving unit 210 receives the data, the TV set interrupts the internet site display (step 518). Also, the TV set sends the URL of the internet site last displayed on the TV set via the data transmitting and receiving unit 210 to the cellular phone (step 519) and then displays a TV program being displayed before the start of the internet display, for example, as shown in the screen display 403 (step 520). In step 520, the TV set again enters the state to operate as a single unit, i.e., in the ordinary mode. Moreover, in step 520, the TV set resumes displaying the content being displayed before the reception of the URL from the cellular phone. It is also possible in step 520 that the TV set only terminates the display of the internet site. This mitigates the operation load imposed on the user to terminate the display on the TV set.

The cellular phone receives the URL of the internet site last displayed on the TV set and then accesses and displays the internet site of the URL (step 510). Resultantly, the internet site display is changed from the TV set to the cellular phone, and hence the cellular phone enters the display change mode. The operation of the step is carried out, for example, under supervision of the control unit 301. Through the operation of this step, the cellular phone resumes the internet site display.

In this situation, the system control unit 301 changes the function to assign part of the keys of the input unit 102 to operate the TV set from the cellular phone and treats the keys as those to ordinarily operate the cellular phone (step 511). The screen display is changed, for example, from the screen display 404 to the screen display 401, and the user continues browsing the internet site display as shown in the screen display 401 (step 512). In step 512, the cellular phone returns to the state to operate as a single unit, i.e., in the ordinary mode.

As above, the URL of the internet site to be browsed on the mobile terminal 101 is sent by radio to the internet connection terminal 100. The terminal 100 having received the URL displays the internet site. From the mobile terminal 101, the user operates the internet connection terminal 100 displaying the internet site.

When the user presses only once the button to change the internet display to the internet connection terminal 100, the mobile terminal 101 changes from the ordinary mode for the operation as a single unit to the display change mode to change the display to the internet connection terminal 100. Subsequently, the mode is sequentially changed to the operation change mode to operate the internet connection terminal 100 from the mobile terminal 101. Also, to display the internet again on the mobile terminal 101, if the user presses only once the button to view the internet on the mobile terminal 101, the mobile terminal 101 conducts a sequence of transition steps. Specifically, the mobile terminal 101 terminates the operation change mode and enters to the display change mode, and then returns to the ordinary mode.

Without conducting any operation for the terminal which desires to display an internet site as above, the user can display the internet site on a large screen through a simple operation using only the mobile terminal 100. Also, the user can continuously employ the mobile terminal 100 to operate the terminal which has displayed the internet site. The user is capable of smoothly conducting a change-over of the display of the internet site between different terminals.

In the screen display 406 of the embodiment, the internet site is displayed on the display unit 206 of the internet connection terminal 101 in the full screen display mode. However, the internet site may be displayed in a partial area of the screen.

In the embodiment, while an internet site is being browsed on the mobile terminal 101, an entity which conducts the communication via the internet and the processing to receive information to produce a video therefrom is changed from the mobile terminal 101 to the internet communication device or terminal 100. Therefore, for example, if the communication speed of the internet communication device 100 to conduct communication via the internet is higher than that of the mobile terminal 101 to conduct communication via the internet, the user can conduct the operation to carry out the internet browsing from the mobile terminal 101 and also can of conducting the operation through the higher-speed communication.

In the description of the embodiment, a TV set, a set box device, and a server for DLNA may be employed as the internet communication device 100. In this connection, by using these devices, it is possible to solve problems occurring in some situations as follows.

For example, these information processing devices such as a TV set are installed in a living room or the like to be commonly used by a plurality of persons in many cases. There likely occurs a situation wherein the viewing of the display of the TV set is required to be abruptly interrupted, leading to a problem. Specifically, since a plurality of persons are viewing the TV set, it is difficult for a person to display an internet site on the TV.

For the user to continue the viewing of the internet site on the mobile terminal 100, there will be considered a case in which, for example, the user interrupts the viewing of the internet site display screen on the TV set to activate the browser of the cellular phone with a communication function and then inputs a URL of the internet site to the cellular phone to thereby continue the viewing on the cellular phone. This however leads to a problem of increase in the number of operation steps.

In consideration of this situation, the problem can be solved by using the mobile terminal 101 and the internet connection device 100 according to the embodiment. Additionally, there is obtained usability and operability for the user to easily carry out the operation to change the entity of the display and the communication from the mobile terminal 101 to the internet connection device 100 and vice versa.

Although description has been given of the internet as an example of content information in conjunction with the embodiment, the embodiment is not restricted by this example. That is, information indicating such content as a TV program is also available. Also, a URL has been described as an example of the identification information. However, the embodiment is not limited to the URL. For example, information indicating a channel of a TV program may also be used as the identification information.

Second Embodiment

Description will now be given of a second embodiment. Specifically, description will be given of a method of implementing an operation equivalent to that of the first embodiment, by use of an infrared-ray communication to communicate an URL and indications of various operations between the internet communication terminal 100 and the mobile terminal 101.

The second embodiment will be described by referring to the drawings. In the description, almost the same constituent components as those of the first embodiment are assigned with the same reference numerals, and description thereof will be avoided.

Figure 6:
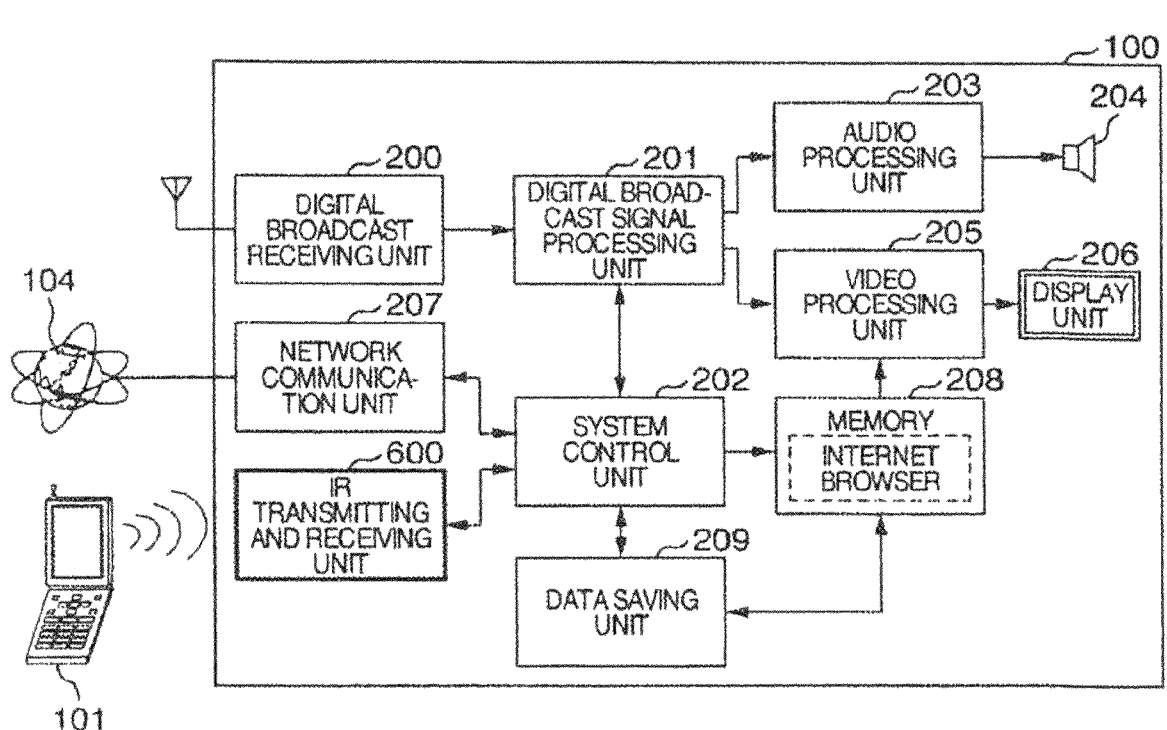
FIG. 6 is a block diagram showing a configuration of a second embodiment of an internet connection terminal.

The internet communication terminal 100 of the second embodiment shown in FIG. 6 differs from that of the first embodiment shown in FIG. 2 in that the data transmitting and receiving unit 210 is replaced by an infrared-ray transmitting and receiving unit 600. The unit 600 communicates data according to a communication format prescribed by, for example, a maker and using an infrared-ray communication conforming to the IrDA (Infrared Data Association) standard.

Figure 7:
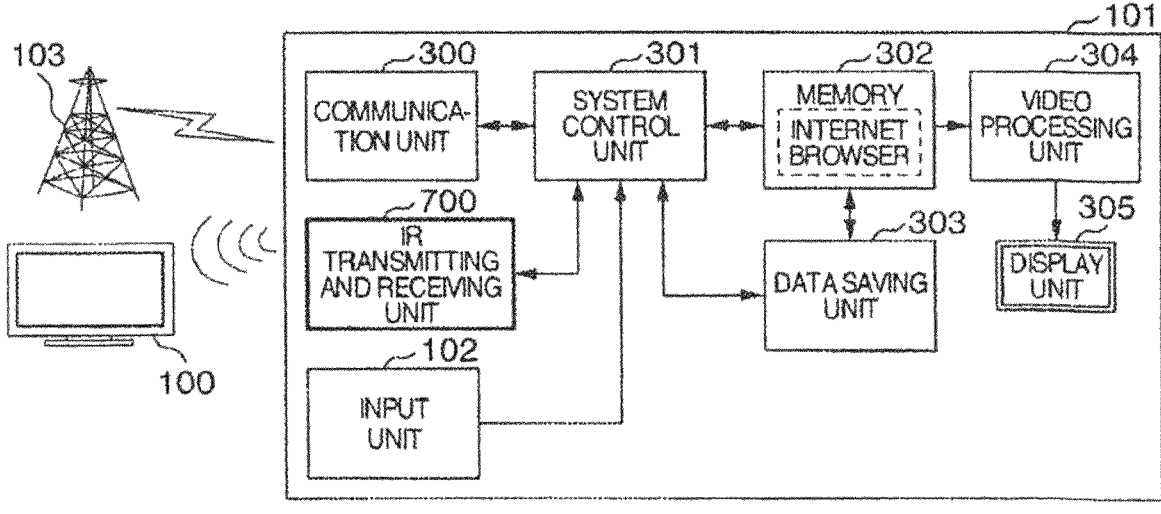
FIG. 7 is a block diagram showing a configuration of a second embodiment of a mobile terminal.

The mobile terminal 101 of the second embodiment shown in FIG. 7 differs from that of the first embodiment shown in FIG. 2 in that the data transmitting and receiving unit 306 is replaced by an infrared-ray transmitting and receiving unit 700. The unit 700 communicates data using an infrared-ray signal conforming to, for example, the IrDA standard.

Figures 8A, 8B:
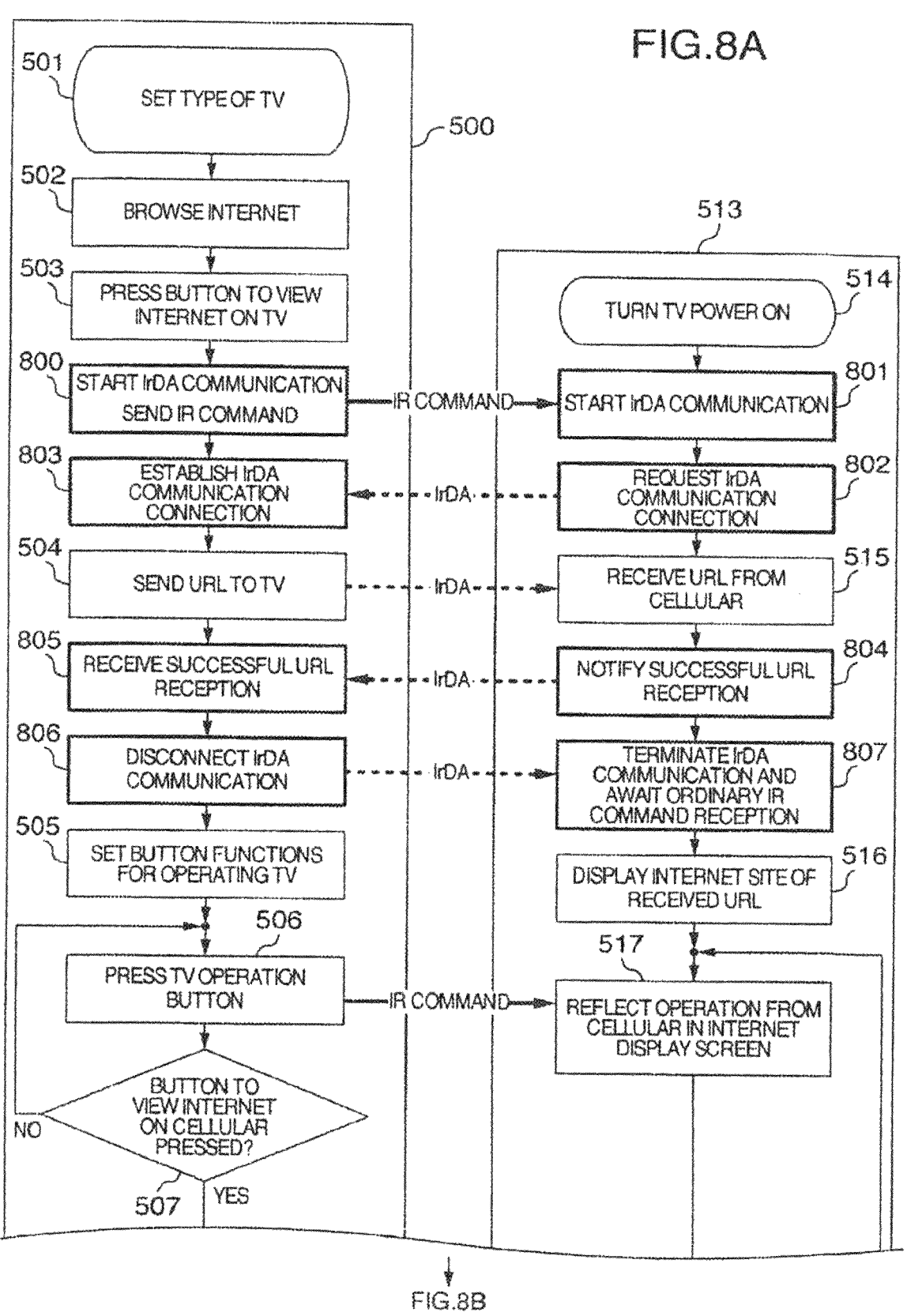
FIGS. 8A and 8B are a flowchart for explaining operations of an internet connection terminal and a mobile terminal in the second embodiment.
Figure 8B:
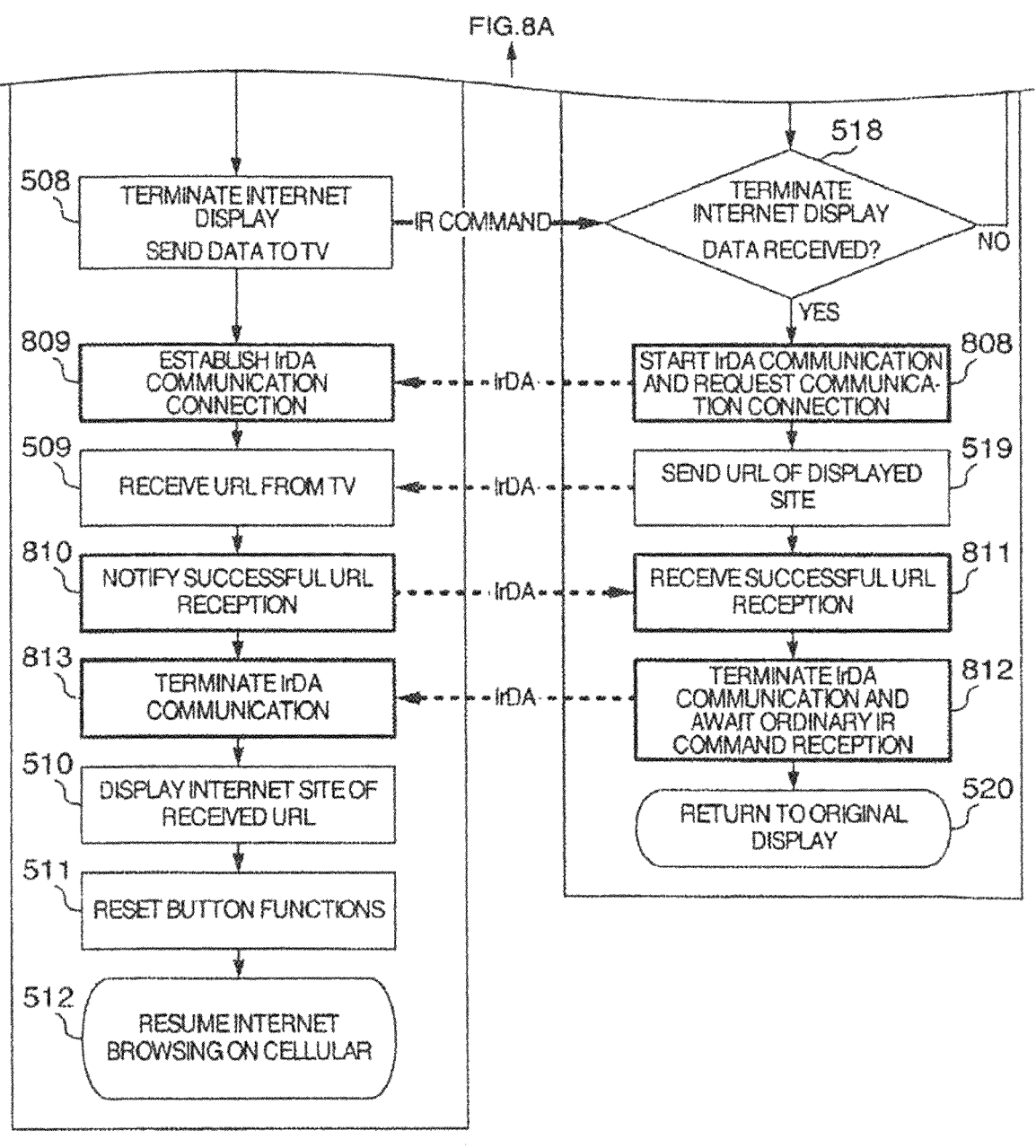

Referring now to FIGS. 6 and 7 and the flowchart of FIGS. 8A and 8B, description will be given of operation of the second embodiment. According to this embodiment, in the reception and reproduction of a digital broadcast, when the internet connection terminal 100 receives an URL of an internet site sent through an infrared-ray communication from the mobile terminal 101 as a result of an operation by the user, the internet connection terminal 100 displays the internet site and then receives an operation of the terminal 100 from the mobile terminal 101 through the infrared-ray communication.

FIGS. 5A and 5B are added with the steps in bold-line frames to the flowchart of FIG. 5 of the first embodiment. In FIGS. 8A and 8B, like in FIG. 5, operations respectively of the mobile terminal 101 and the internet connection terminal 100 are shown in the frames 500 and 513, respectively. In association with explanation of respective operation flows in the frames 500 and 513, description will be given of the operation flows in the terminals 101 and 100 and a relationship therebetween. Assume in the description that a cellular phone is employed as an example of the mobile terminal 101 and a television set including an internet connecting function is used as an example of the internet connection terminal 100.

First, by using, for example, the input unit 102, the user beforehand sets to the cellular phone a type of the television set for the internet browsing, which will be described later, by designating a maker and a model number using a predetermined setting screen (step 501). In this embodiment, the command is, for example, a general infrared-ray command to be received and processed by a TV set. The general infrared-ray command is a command which is transmitted in a format of, for example, a Pulse Position Modulation (PPM). The format of the command is determined, for example, for each maker and is a format employed for the communication with an associated remote control device.

The user powers the TV set by conducting an ordinary operation. The TV set receives a broadcast via the digital broadcast receiving unit 200 and reproduces the broadcast as described above (step 514).

The user conducts an operation to start a predetermined internet display on the cellular phone. As a result, an internet site is displayed on the screen display 401 so that the user browses the internet site (step 502).

Assume that the user attempts, during the internet site browsing, to browse the internet site by use of the TV set. In this situation, the user operates the input unit 102 of the cellular phone to select the button 402 in the display unit 305 (step 503).

In response to the operation, the infrared-ray transmitting and receiving unit 700 of the cellular phone transmits an infrared-ray command recognizable by a TV set of the type designated in step 501 to thereby start IrDA communication (step 800). The TV set having received the command starts the IrDA communication (step 801) to request the cellular phone to connect to the IrDA communication (step 802). The cellular phone prepares, immediately after the command transmission in step 800, to start connecting to the IrDA communication and responds to the IrDA communication connection from the TV set. The IrDA communication connection is established between the TV set and the cellular phone (step 803). After the URL transmission or in concurrence therewith, the system control unit 301 controls the display unit 305 and associated constituent elements to terminate the internet site display on the cellular phone.

After the IrDA communication connection is established, the system control unit 301 of the cellular phone sends by the infrared-ray transmitting and receiving unit 700 the URL of the internet site being on the display through the IrDA communication to the TV set (step 504).

The TV set receives the URL via the infrared-ray transmitting and receiving unit 600 from the cellular phone (step 515). Also, the TV set sends by the infrared-ray transmitting and receiving unit 700 data indicating successful reception of the URL via the IrDA communication to the cellular phone (step 804). When the data is received (step 805), the cellular phone disconnects the IrDA communication conducted by the unit 700 (step 806). As a result of the disconnection, the TV set also terminates the IrDA communication of the data transmitting and receiving unit 600 to enter a state to receive an ordinary infrared-ray command also used by a remote control device, not shown. The TV set then connects to the internet site indicated by the URL in the procedure described above, and displays the internet site on the display unit 206 as indicated by the screen display 406 (step 516).

On the other hand, after the transmission of the URL, the cellular phone enters a state in which the system control unit 301 is capable of operating the TV set, which will be described later, by using part of the input unit 102. The display unit 305 presents a display to inform the user of operations which can be conducted by pressing keys as shown, for example, in the screen display 404 (step 505). In this state in which the TV set can be operated, if the user presses an associated key of the input unit 102, an infrared-ray command which indicates an operation for the TV set and which can be interpreted by the TV set designated in step 501 is sent via the infrared-ray transmitting and receiving unit 700 to the TV set. The infrared-ray command includes information almost the same as that of an infrared-ray command sent from a remote control device of the TV set. Therefore, in a situation wherein it is desired to move a selection item of an internet site being displayed on the TV set or to determine a selection item, if the user operates the input unit 102 of the cellular phone to press a key corresponding to an operation information item shown in the screen display 404, the cellular phone sends an indication of the operation to the TV set (step 506).

When the operation indication is received from the cellular phone, the TV set reflects the information of the indication in the screen display 406 displaying the internet and in the operation of the browser 208 (step 517).

In the state in which the user browses the internet site on the TV set, if it is desired to return to a state in which the user browses the internet site on the cellular phone, the user conducts an operation to select an associated item of the button display 405 in the display unit 305 of the cellular phone (step 507). Then, the cellular phone sends an infrared-ray command indicating termination of the internet display via the infrared-ray transmitting and receiving unit 700 to the TV set (step 508).

When the infrared-ray command is received, the TV set interrupts the internet site display (step 518). The TV set starts the IrDA communication to request the cellular phone to connect to the IrDA communication (step 808). On the other hand, immediately after the transmission of the infrared-ray command, the cellular phone starts the IrDA communication to receive the request for the connection to the IrDA communication from the TV set, and the IrDA communication is resultantly established (step 809).

After the communication connection is established, the TV set sends the URL of the internet site last displayed on the TV set via the infrared-ray transmitting and receiving unit 600 to the cellular phone (step 519). The cellular phone receives the URL (step 509) and sends data indicating successful reception of the URL through the IrDA communication to the TV set (step 810). The TV set receives the data (step 811), terminates the IrDA communication of the unit 600, and enters a state to receive an ordinary infrared-ray command like that to be received from a remote control device, not shown (step 812). Also, the TV displays a TV program being displayed before the start of the internet display, for example, as shown in the screen display 403 (step 520).

On the other hand, after receiving the URL of the internet site last displayed on the TV set, the cellular phone terminates the IrDA communication (step 813) and then accesses and displays the internet site of the URL (step 510). In this situation, the system control unit 301 changes the function to assign part of the keys of the input unit 102 to operate the TV set from the cellular phone and treats the keys as those to ordinarily operate the cellular phone (step 511). The screen display is changed, for example, from the screen display 404 to the screen display 401, and the user continues browsing the internet site display as shown in the screen display 401 (step 512).

As above, the URL of the internet site to be browsed on the mobile terminal 101 is sent through the infrared-ray communication to the internet connection terminal 100. The terminal 100 having received the URL displays thereon the internet site. From the mobile terminal 101, the user operates the internet connection terminal 100 displaying the internet site. In Association with the transmission of the URL and the operation indication, the operation in which the TV set is operated from the cellular phone is implemented, by conducting a change-over between the communication using an infrared-ray command received by the TV from a remote control device and the communication of IrDA.

Therefore, without conducting any operation for the terminal which desires to display an internet site as above, the user can display the internet site on a larger screen through a simple operation using only the mobile terminal 100. Also, the user can continuously use the mobile terminal 100 to operate the terminal which has displayed the internet site. The user is capable of smoothly conducting a change-over of the internet site display between different terminals.

Although the IrDA communication is employed to transmit the URL in the configuration of the embodiment, there may be employed any appropriate communication other than the IrDA communication.

In the description of the embodiment, a TV set, a set box device, and a server for DLNA may be employed as the internet communication device 100. In this connection, by using these devices, it is possible to solve problems occurring in some situations as follows.

For example, for the general infrared-ray command used in a TV set, the types of such commands to be communicated are limited or the communication speed is limited. On the other hand, the signal indicating information of operation is larger in the amount of information than the signal which is communicated by a remote control device only to turn on or off the power source. Hence, when the general infrared-ray command used, there occurs a problem in which the URL and the information of operation cannot be communicated between the portable terminal and the information processing apparatus or a problem in which the communication of information, even if possible, takes a long period of time.

On the other hand, in the communication conforming to IrDA, it is required to establish communication between the mobile terminal 101 and the internet connection terminal 100 to communicate information therebetween. Therefore, if a change-over from the communication of the general command to the IrDA communication is not conducted, it is required in any situation that the information processing apparatus enters the state to wait for the IrDA communication. Moreover, if the state to establish the connection is kept set as above, there occurs a drawback in which the internet connection terminal 100 cannot conduct the infrared-ray communication with other devices.

According to the embodiment, since the communication is changed using as a trigger a command, i.e., a general infrared-ray command, the drawback is removed, and it is possible to improve operability and usability.

Although the IrDA communication has been described as an example in the embodiment, it is also possible to use, for example, a communication by Bluetooth, a wireless communication such as a wireless LAN, and a short-distance communication such as a communication by sound waves. The embodiment is particularly useful in a communication using a communication scheme in which a communication link is established to communicate information.

Although description has been given of the internet as an example of the content information in conjunction with the embodiment, the embodiment is not restricted by this example. That is, information indicating such content as a TV program is also available. Moreover, a URL has been described as an example of the identification information. However, the embodiment is not limited by this example. For example, information indicating a channel of a TV program may also be used as the identification information.

Third Embodiment

Description will now be given of a third embodiment, specifically, a method of implementing an operation in the communication of an URL and indications of various operations between the internet communication terminal 100 and the mobile terminal 101 of the first embodiment. According to the embodiment, there are conducted not only an operation to display internet indicated by the URL, but also an operation in which the state of the mobile terminal 101 displaying the internet site is also passed from the mobile terminal 101 to the internet communication terminal 100.

The state of the mobile terminal 101 displaying the internet site indicates, for example, a state wherein the mobile terminal 101 is displaying a screen after the login of an internet site for which the state authentication is required. Furthermore, wherein the mobile terminal 101 is displaying a screen indicates a display state after a display state change of an internet site in which a content display state dynamically changes with an associated URL kept unchanged.

The information representing the display state includes, for example, information indicating a history of user operations which have influenced upon the display on the display unit 305. The information representing the display state may also include information which is not included in the URL and which influences upon the display on the display unit 305 in the internet site browsing. Also, the display state representing information may be information indicating a character encoding item designating, for example, Shift-JIS, enhanced Unix Code (EUC), or Unicode Transformation Format (UTF)-8. In addition, the information may also be Cookie. Furthermore, in a situation wherein the mobile terminal 101 is displaying an internet site, the information may be information indicating, for example, the position of a scroll bar. As for the position of a pointer or the like, the information may be information indicating a relative position thereof on the display screen. As a result, even if the display area size varies between the mobile terminal 101 and the internet connection terminal 100, the relative position can be reproduced on the internet connection terminal 100.

The third embodiment will be described by referring to the drawings wherein an internet site requiring authentication is passed from the mobile terminal 101 to the internet connection terminal 100. In the description, almost the same constituent components as those of the preceding embodiments are assigned with the same reference numerals, and description thereof will be avoided.

FIG. 9 shows an example of items and information thereof in a user operation history 900 used in an operation in which the user browses an internet site requiring authentication. Specifically, the mobile terminal 101 records the items of the operation history for each user operation for the internet site and then saves the operation history 900 in the data saving unit 303.

The information in the operation history 900 includes, for example, a character string inputted to a text box, information items indicating a button and an icon used on the internet site, and information indicating an item selected in a list box. The information in the operation history 900 may also include information indicating a URL displayed as a result of the operation.

Figures 10, 11:
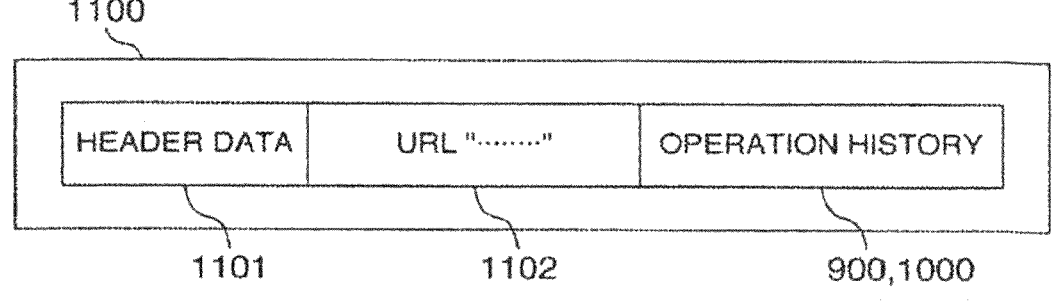
FIG. 10 is a table showing a data layout of an operation history in the third embodiment.
FIG. 11 is a table showing a data layout of transmitted data in the third embodiment.

FIG. 10 shows an example of items and information thereof in a user operation history 1000 used in an operation wherein the user browses an internet content in which the internet content dynamically changes with the URL kept unchanged. The mobile terminal 101 records the items of the operation history 1000 for each user operation for the internet content and then saves the operation history 1000 in the data saving unit 303. The operation history 1000 includes, for example, information indicating a position of coordinates clicked by the user.

FIG. 11 shows transmitted data sent from the mobile terminal 101 to the internet connection terminal 100. The data 1100 includes header data 1101 including a data length and information to identify a data type, an internet site URL 1102, and an operation history 900.

Next, operation of the third embodiment will be described by referring to FIGS. 9 to 11 and the flowchart of FIG. 12. In the embodiment, if the internet site to be browsed by the user is, for example, an internet site requiring authentication or an internet content in which the internet content dynamically changes with the URL kept unchanged, the mobile terminal 101 records an operation history 900 of user operations for the internet site. In the transmission of a URL of an internet site to the internet connection terminal 100 in a manner similar to that of the first embodiment, the mobile terminal 101 sends transmission data 1100 including the operation history in addition to the URL thereto. If the data 1100 is received, the terminal 100 accesses the internet site of the URL, conducts an operation substantially equal to the user operation indicated by the operation history 900 for the resultantly displayed internet site, and displays the internet site for which the operation has been carried out.

Figure 12:
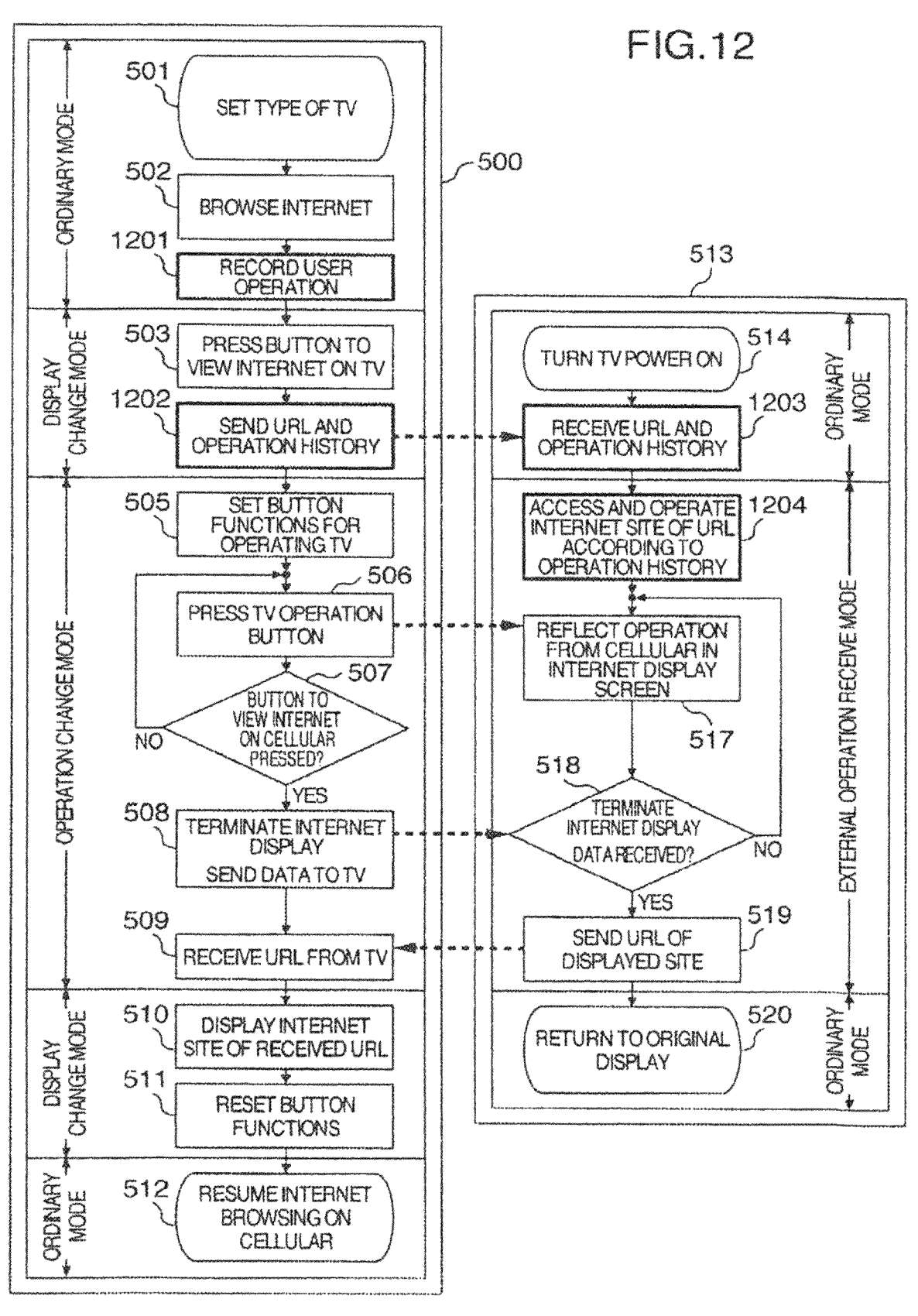
FIG. 12 is a flowchart for explaining operations of an internet connection terminal and a mobile terminal in the third embodiment.

FIG. 12 is a flowchart implemented by adding steps shown in bold-line frames to the flowchart of FIG. 1 used in the first embodiment. FIG. 12 shows operations respectively of the mobile terminal 101 and the internet connection terminal 100 respectively in frames 500 and 513 as in FIG. 5. Description will be given of the operations of the frames 500 and 513 in a concurrent fashion. That is, the operation flows of the terminals 101 and 100 and a relationship between the operation flows will be described at the same time. Assume in the description that a cellular phone is employed as an example of the mobile terminal 101 and a television set including an internet connecting function is used as an example of the internet connection terminal 100.

According to the embodiment, in a situation wherein the user is browsing an internet site in step 502, each time the user conducts an operation, e.g., selection or input of a data item for the internet site, the cellular phone records the operation histories 900 and 1000 in the data saving unit 209 (step 1201).

However, it is not necessary required that the cellular phone records the operation histories 900 and 1000 of all internet sites browsed by the user. That is, the cellular phone may record the histories only for each internet site for which, for example, the URL starts with Hypertext Transfer Protocol Security (HTTPS), i.e., for which security is essential, each internet site dynamically created by a function such as Active Server Pages (ASP), or each internet site of which document layout information of the displayed internet site includes an interactive content such as FLASH (registered trademark). If the internet site includes a content of FLASH or ASP, the site is defined using a tag in a source file. Hence, the cellular phone can determine the type of the internet site using the tag.

Also, if the internet site is an internet site dynamically created, it is not required to store all operation histories in the operation history 1100. The operation history may be configured to record a history associated with operations which have changed the display. For example, if the internet site includes a dynamic FLASH content, the operation history may be configured to record operations such as a clicking operation and an input operation of a character string for the dynamic content.

In step 503, to view the internet site on the TV set, when the user conducts an operation to select a button corresponding to the button display 402 presented on the display unit 305 of the cellular phone, the cellular phone creates transmission data 1100 including a URL 1102 of the internet site as an initial point of the recording for the operation history 900 or 1000, the operation history 900 or 1000, and header data 1101, and then sends the transmission data 1100 to the TV set. After the URL transmission, the system control unit 301 controls the display unit 305 to terminate the display of the internet site on the cellular phone.

On the other hand, at reception of the transmission data 1100 (step 1203), the TV set accesses the internet of the URL 1102, conducts the operation indicated by the operation history 900 or 1000 for the internet site, and displays the internet site for which the operation has been conducted (step 1204).

In steps 509 and 519 in which the TV set sends a URL to the cellular phone to return control to the cellular phone to access and to display the internet site, a method similar to that described above is also employed.

If the internet site which the user browses on the cellular phone is an internet site requiring authentication or an internet content in which the internet content dynamically changes with the URL kept unchanged, the TV set records the operation histories 900 and 1000 of user operations for the internet site in the data saving unit 209. Also, the TV set sends transmission data 1100 including a URL of the internet site as an initial point of the recording for the operation histories 900 and 1000 and the operation histories 900 or 1000 to the cellular phone. The cellular phone having received the data 1100 accesses the internet site of the URL and conducts an operation indicated by the operation histories 900 and 1000, producing an internet site in the state after the operation. The TV set also displays the internet site thus produced.

Therefore, to conduct a change-over operation of the access to one and the same internet site between different terminals, it is possible for the user, also in a situation wherein the internet site being browsed is an internet site requiring authentication or is a dynamically changing internet content with the URL kept unchanged, to smoothly achieve the change-over operation without again conducting the authentication and the content operation for the terminal which accesses the internet site after the change-over.

In a situation wherein a cellular phone sends a URL without any display information to an information processing apparatus such as a TV set, an internet site of the URL is displayed on the information processing apparatus in a state in which no operation influencing the display has been conducted. Hence, if the configuration of the internet site becomes more complex, a larger number of operation steps are required from the transmission of the URL to the setup of the state in which the operation on the cellular phone is reflected in the information processing apparatus. However, according to the mobile terminal 101 and the internet connection terminal 100 of the embodiment, it is possible to reduce the operation steps.

Description has been given of the first to third embodiments. The smooth access change-over associated with the internet communication between a plurality of terminals is achievable even if the mobile terminal 101 is replaced with any other information processing terminal.

According to the portable terminal of the embodiments, there are provided a portable terminal, an information processing apparatus, a content display system, and a content display method in which the viewing of a content on the portable terminal is smoothly passed to an information processing apparatus.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A smartphone comprising:

a network transceiver configured to communicate over an Internet and conduct communication with an external display apparatus configured to execute video processing for displaying a video content on an external display panel different from a display panel of the smartphone;

the display panel configured to display the video content received by the network transceiver, and further configured to display a setting screen for designating the external display apparatus;

a user operation input interface configured to receive a user operation provided by a user, and further configured to receive an input of information to designate the external display apparatus from the user on the setting screen; and a controller configured to:

during display of the video content received via the network transceiver on the display panel, based on the user operation input interface receiving, at a first point of time, a first user operation to display on the external display panel of the external display apparatus the video content displayed on the display panel, control the network transceiver to transmit first information containing identification information identifying the video content displayed on the display panel to the external display apparatus, without transmitting the video content itself to the external display apparatus, in order for the external display apparatus to display on the external display panel the same video content as the video content displayed on the display panel at the first point of time;

based on transmission of the first information via the network transceiver, control the display panel to display information for receiving a second user operation to operate the video content displayed on the external display panel of the external display apparatus after the first point of time;

during display of the information for receiving the second user operation on the display panel, based on the user operation input interface receiving, at a second point of time, the second user operation to operate the video content displayed on the external display panel of the external display apparatus, control the network transceiver to transmit second information related to the second user operation to the external display apparatus, by which the smartphone is caused to serve as a remote-control device which is configured to operate the video content being displayed on the external display panel of the external display apparatus;

during display of the video content on the external display panel of the external display apparatus, based on the user operation input interface receiving, at a third point of time, a third user operation to display on the display panel the video content displayed on the external display panel of the external display apparatus, control the network transceiver to transmit third information related to the third user operation to the external display apparatus, by which the smartphone is caused to terminate serving as the remote-control device configured to operate the video content displayed on the external display panel; and based on transmission of the third information via the network transceiver, control the display panel to display the same video content, without receiving the video content from the external display apparatus, as the video content displayed on the external display panel of the external display apparatus at the third point of time, wherein the first information further contains display state information indicating a state of displaying the video content on the display panel at the first point of time, which causes the external display apparatus to begin displaying the video content so that viewing of the video content on the display panel is relayed to the external display panel.

2. The smartphone according to claim 1, wherein the display state information contains positional information of the video content on the display panel.

3. The smartphone according to claim 1, wherein the display state information contains history information indicating a history of operations performed while the video content is being displayed on the display panel.

4. The smartphone according to claim 1, wherein the controller is configured to control the display panel, based on transmission of the first information by the network transceiver, to terminate the display of the video content on the display panel.

5. The smartphone according to claim 1, wherein the controller is configured to control the display panel, after transmission of the first information to the external display apparatus, to display an option that allows resuming the display of the video content on the display panel instead of on the external display panel of the external display apparatus.

6. The smartphone according to claim 1, wherein the display panel comprises a touch panel serving as the user operation input interface, configured to detect a user operation on the display panel by a user, when a first icon displayed on the display panel is touched by the user, the first user operation is input to the user operation input interface, and when a second icon displayed on the display panel is touched by the user, the third user operation is input to the user operation input interface.

7. The smartphone according to claim 6, wherein the controller is configured to:

control the touch panel not to accept the third user operation via the user's touch on the second icon when the first user operation via the user's touch on the first icon is acceptable; and control the touch panel not to accept the first user operation via the user's touch on the first icon when the third user operation via the user's touch on the second icon is acceptable.

8. The smartphone according to claim 6, wherein the controller is configured to control the display panel not to display the second icon when the first icon is displayed, and not to display the first icon when the second icon is displayed.

9. The smartphone according to claim 6, wherein the first icon and the second icon are alternately displayed at a same position on the display panel.

10. The smartphone according to claim 6, wherein the display panel has a first display area and a second display area, the first display area is at least within a top half of the display panel and the second display area is at least within a bottom half of the display panel, and the first icon and the second icon are displayed exclusively in the same area, either the first display area or the second display area, but not both.

11. The smartphone according to claim 1, wherein the first information contains login information used for receiving the video content via the network transceiver.

12. A display apparatus displaying a video content acquired via a television broadcast or via an Internet and receiving from a remote controller an operation input for digital broadcast signal reception and an operation input for video content acquisition via the Internet, the display apparatus comprising:

a digital broadcast receiver configured to receive a digital broadcast signal via a TV antenna;

a signal separator configured to conduct demultiplexing of the digital broadcast signal into audio data and video data;

a video processor configured to convert a format of the video data;

an audio processor configured to convert a format of the audio data;

a network transceiver configured to communicate over the Internet and conduct communication with an external smartphone, the smartphone being different from the remote controller;

a remote-control receiver configured to receive a command from the remote controller;

a display panel; and a controller configured to control an operation mode of the display apparatus, wherein the controller is configured to:

control the operation mode of the display apparatus to a first operation mode in response to the operation input from the remote controller via the remote-control receiver, wherein in the first operation mode, the signal separator is configured to demultiplex the digital broadcast signal received by the digital broadcast receiver into audio data and video data, the video processor is configured to convert the format of the video data, and the display panel is configured to display a first video content based on the converted video data;

in response to reception of first information containing identification information for identifying a second video content from the smartphone via the network transceiver, without receiving the operation input from the remote controller, control the operation mode of the display apparatus to terminate the first operation mode and start a second operation mode, and control the network transceiver to acquire the second video content via the Internet based on the identification information, wherein in the second operation mode, the display panel is configured not to display the first video content and configured to display the second video content, and the second video content is the same video content as the video content displayed on the smartphone before the smartphone transmits the first information to the display apparatus;

in the second operation mode, in response to reception of second information for operating the second video content displayed on the display panel via the network transceiver from the smartphone without receiving the operation input from the remote controller, control display of the second video content on the display panel based on the second information, the second information being different from the first information; and in response to reception of third information via the network transceiver from the smartphone without receiving the operation input from the remote controller, control the operation mode of the display apparatus to terminate the second operation mode capable of controlling display of the second video content being displayed on the display panel based on the second information, wherein the first information further contains display state information indicating a state of displaying the video content on the smartphone, and wherein the controller is configured to control the display panel to begin displaying the second video content based on the display state information so that viewing of the video content on the smartphone is relayed to the display panel.

13. The display apparatus according to claim 12, wherein the display state information contains positional information of the video content on the smartphone.

14. The display apparatus according to claim 12, wherein the display state information contains historical information indicating a history of operations performed while the video content is being displayed on the smartphone.

15. The display apparatus according to claim 12, wherein the first information received from the smartphone contains login information, and the controller is configured to control the network transceiver to acquire the second video content using the identification information and the login information.

16. A content display system comprising a smartphone and a display apparatus, wherein the smartphone comprises:

a first network transceiver configured to communicate over an Internet and conduct communication with the display apparatus;

a first display panel configured to display a video content received by the first network transceiver, and further configured to display a setting screen for designating the display apparatus;

a user operation input interface configured to receive a user operation provided by a user, further configured to receive an input of information to designate the display apparatus from a user on the setting screen; and a first controller configured to:

during display of the video content received via the first network transceiver on the first display panel, based on the user operation input interface receiving, at a first point of time, a first user operation to display on the display apparatus the video content displayed on the first display panel, control the first network transceiver to transmit first information containing identification information identifying the video content displayed on the first display panel to the display apparatus, without transmitting the video content itself to the display apparatus, in order for the display apparatus to display on the display apparatus the same video content as the video content displayed on the first display panel at the first point of time;

based on transmission of the first information via the first network transceiver, control the first display panel to display information, on the first display panel, for receiving a second user operation to operate the video content displayed on the display apparatus after the first point of time;

during display of the information for receiving the second user operation on the first display panel, based on the user operation input interface receiving, at a second point of time, the second user operation to operate the video content displayed on the display apparatus, control the first network transceiver to transmit second information related to the second user operation to the display apparatus, by which the smartphone is caused to serve as a remote-control device which is configured to operate the video content being displayed on the display apparatus;

during display of the video content on the display apparatus, based on the user operation input interface receiving, at a third point of time, a third user operation to display on the first display panel the video content displayed on the display apparatus, control the first network transceiver to transmit third information related to the third user operation to the display apparatus, by which the smartphone is caused to terminate serving as the remote-control device configured to operate the video content displayed on the display apparatus; and based on transmission of the third information via the first network transceiver, control the first display panel to display the same video content, without receiving the video content from the display apparatus, as the video content displayed on the display apparatus at the third point of time, wherein the display apparatus comprises:

a digital broadcast receiver configured to receive a digital broadcast signal via a TV antenna;

a signal separator configured to conduct demultiplexing of the digital broadcast signal into audio data and video data;

a video processor configured to convert a format of the video data;

an audio processor configured to convert a format of the audio data;

a second network transceiver configured to communicate over the Internet and conduct communication with the smartphone;

a remote-control receiver configured to receive a command from the remote controller which receives an operation input for a digital broadcast signal reception, the remote controller being different from the smartphone;

a second display panel; and a second controller configured to control an operation mode of the display apparatus, wherein the second controller is configured to:

control the operation mode of the display apparatus to a first operation mode in response to the operation input from the remote controller via the remote-control receiver, wherein in the first operation mode, the signal separator is configured to demultiplex the digital broadcast signal received by the digital broadcast receiver into audio data and video data, the video processor is configured to convert the format of the video data, and the second display panel is configured to display a first video content based on the converted video data;

in response to reception of the first information containing the identification information for identifying a second video content from the smartphone via the second network transceiver, without receiving the operation input from the remote controller, control the operation mode of the display apparatus to terminate the first operation mode and start a second operation mode, and control the second network transceiver to acquire the second video content via the Internet based on the identification information, wherein in the second operation mode, the second display panel is configured not to display the first video content and configured to display the second video content, and the second video content is the same video content as the video content displayed on the smartphone before the smartphone transmits the first information to the display apparatus;

in the second operation mode, in response to reception of the second information for operating the second video content displayed on the second display panel via the second network transceiver from the smartphone without receiving the operation input from the remote controller, control display of the second video content on the second display panel based on the second information, the second information being different from the first information; and in response to reception of the third information via the second network transceiver from the smartphone without receiving the operation input from the remote controller, control the operation mode of the display apparatus to terminate the second operation mode capable of controlling display of the second video content being displayed on the second display panel based on the second information, wherein the first information further contains display state information indicating a state of displaying the video content on the first display panel at the first point of time, and wherein the second controller is configured to control the second display panel to begin displaying the second video content based on the display state information so that viewing of the video content on the first display panel is relayed to the second display panel.

17. The content display system according to claim 16, wherein the display state information contains positional information of the video content on the first display panel.

18. The content display system according to claim 16, wherein the display state information contains historical information indicating a history of operations performed while the video content is being displayed on the first display panel.

19. The content display system according to claim 16, wherein the first information contains login information used when receiving the video content via the first network transceiver, and the second controller is configured to control the second network transceiver to acquire the second video content using the identification information and the login information.

* * * * *